United States Patent
Staples

(10) Patent No.: US 12,263,905 B2
(45) Date of Patent: *Apr. 1, 2025

(54) BICYCLE SEAT POST TRAVEL ADJUSTMENT ASSEMBLY

(71) Applicant: D3 Innovation Inc., Squamish (CA)

(72) Inventor: Jonathan Staples, Garibaldi Highlands (CA)

(73) Assignee: D3 Innovation Inc., Squamish (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,506

(22) Filed: May 23, 2022

(65) Prior Publication Data
US 2022/0281546 A1 Sep. 8, 2022

Related U.S. Application Data

(63) Continuation of application No. 16/555,877, filed on Aug. 29, 2019, now Pat. No. 11,364,963.
(Continued)

(51) Int. Cl.
*B62J 1/08* (2006.01)
*B62K 19/36* (2006.01)

(52) U.S. Cl.
CPC ............... *B62J 1/08* (2013.01); *B62K 19/36* (2013.01); *B62J 2001/085* (2013.01)

(58) Field of Classification Search
CPC ........ B62J 1/08; B62J 2001/085; B62K 19/36
See application file for complete search history.

(56) References Cited

U.S. PATENT DOCUMENTS

| | | |
|---|---|---|
| 3,208,767 A | 9/1965 | Alexander |
| 3,730,019 A | 5/1973 | Ballard |
| | (Continued) | |

FOREIGN PATENT DOCUMENTS

| | | |
|---|---|---|
| CN | 105539641 A | 5/2016 |
| CN | 206031585 U | 3/2017 |
| | (Continued) | |

OTHER PUBLICATIONS

Third party prior art submission made to German patent office dated Feb. 9, 2022 regarding related German application No. 10 2020 109 014.5, including copies of references i) TW I562922, ii).
(Continued)

*Primary Examiner* — Bradley Duckworth
(74) *Attorney, Agent, or Firm* — Marks & Clerk; Kevin Shipley

(57) ABSTRACT

There is described a bicycle seat post assembly in which the travel distance of the seat post can be adjusted. The seat post assembly includes an outer tube that is configured to telescopically receive an inner tube. The inner tube is axially slidable relative to the outer tube between a retracted position and an extended position, the extended position being determined by an extension assembly in which an inner contact member engages an outer contact member, thereby setting the upper limit of axial extension of the inner tube. The extension of the inner tube can be limited to an intermediate position that lies between the retracted and extended positions by an insertable shim that is positionable between the inner and outer contact members.

20 Claims, 15 Drawing Sheets

Related U.S. Application Data

(60) Provisional application No. 62/830,405, filed on Apr. 6, 2019, provisional application No. 62/725,580, filed on Aug. 31, 2018.

(56) References Cited

U.S. PATENT DOCUMENTS

| | | | |
|---|---|---|---|
| 4,354,398 A | 10/1982 | Porter | |
| 4,421,357 A | 12/1983 | Shimano | |
| 4,807,856 A | 2/1989 | Teckenbrock | |
| 4,916,968 A | 4/1990 | Kabaya | |
| 4,995,753 A | 2/1991 | Shook | |
| 5,044,648 A | 9/1991 | Knapp | |
| 5,226,624 A | 7/1993 | Kingsbery | |
| 5,244,301 A | 9/1993 | Kurke | |
| 5,466,042 A | 11/1995 | Herman | |
| 5,649,738 A | 7/1997 | Thomson | |
| 5,664,829 A | 9/1997 | Thomson | |
| 5,722,718 A | 3/1998 | Still | |
| 5,829,733 A | 11/1998 | Becker | |
| 5,857,657 A | 1/1999 | Yamamoto | |
| 5,881,988 A * | 3/1999 | Liu | B62J 1/08 280/220 |
| 5,899,530 A | 5/1999 | Tedesco | |
| 5,909,890 A | 6/1999 | Sachs | |
| 5,979,978 A | 11/1999 | Olsen | |
| 6,220,582 B1 | 4/2001 | Wandschneider | |
| 6,276,756 B1 | 8/2001 | Cho | |
| 6,688,331 B2 | 2/2004 | Demersseman | |
| 7,007,587 B2 | 3/2006 | Zanden | |
| 7,025,522 B2 * | 4/2006 | Sicz | B62K 19/36 403/379.5 |
| 7,059,592 B2 | 6/2006 | Huh | |
| 7,083,180 B2 | 8/2006 | Turner | |
| 7,231,866 B2 | 6/2007 | Seong | |
| 7,306,206 B2 * | 12/2007 | Turner | B62K 19/36 280/287 |
| 7,721,640 B2 | 5/2010 | Lee | |
| 7,845,602 B1 | 12/2010 | Young | |
| 8,079,772 B1 * | 12/2011 | Brennan | F16B 7/105 403/322.2 |
| 8,167,373 B2 | 5/2012 | Allison | |
| 8,177,251 B2 * | 5/2012 | Shirai | B62J 1/08 280/288.4 |
| 8,191,964 B2 | 6/2012 | Hsu | |
| 8,308,124 B2 | 11/2012 | Hsu | |
| 8,328,454 B2 * | 12/2012 | McAndrews | B62K 25/08 297/215.13 |
| 8,550,551 B2 | 10/2013 | Shirai | |
| 8,752,893 B2 * | 6/2014 | Chien | B62J 1/08 267/132 |
| 8,814,109 B2 * | 8/2014 | Laird | B62K 23/06 297/215.14 |
| 8,926,216 B2 | 1/2015 | McAndrews | |
| 9,073,592 B2 | 7/2015 | Hsu | |
| 9,376,159 B2 * | 6/2016 | Kuo | B62K 19/36 |
| 9,688,331 B1 * | 6/2017 | Shirai | B62J 1/08 |
| 9,878,753 B2 | 1/2018 | Tsai | |
| 9,969,448 B1 | 5/2018 | Chen | |
| 10,189,522 B2 * | 1/2019 | Pittens | B62J 1/06 |
| 10,450,022 B2 * | 10/2019 | Watson | F16H 25/2204 |
| 10,513,300 B2 * | 12/2019 | Bowers | B62K 3/02 |
| 10,549,803 B2 * | 2/2020 | Shipman | B62K 19/36 |
| 10,787,215 B1 | 9/2020 | Staples | |
| 10,974,781 B2 | 4/2021 | Staples | |
| 11,104,395 B2 | 8/2021 | Staples | |
| 11,180,212 B2 | 11/2021 | Shirai | |
| 11,364,963 B2 * | 6/2022 | Staples | B62J 1/08 |
| 11,447,201 B2 | 9/2022 | Coaplen et al. | |
| 11,479,314 B2 | 10/2022 | Staples | |
| 11,767,073 B2 | 9/2023 | Staples | |
| 11,780,520 B1 | 10/2023 | Staples | |
| 11,834,121 B2 | 12/2023 | Staples | |
| 11,964,722 B2 | 4/2024 | Staples | |
| 12,024,253 B2 | 7/2024 | Staples | |
| 2002/0185581 A1 | 12/2002 | Trask | |
| 2003/0234144 A1 | 12/2003 | Fox | |
| 2004/0065238 A1 | 4/2004 | Chen | |
| 2004/0070168 A1 | 4/2004 | Mckinnon | |
| 2005/0067863 A1 | 3/2005 | Roizen | |
| 2006/0066074 A1 | 3/2006 | Turner | |
| 2006/0152045 A1 | 7/2006 | Okajima | |
| 2006/0280552 A1 | 12/2006 | Turner | |
| 2007/0046081 A1 | 3/2007 | Shook | |
| 2007/0063554 A1 | 3/2007 | Liao | |
| 2007/0286671 A1 | 12/2007 | Meggiolan | |
| 2009/0066124 A1 | 3/2009 | Pirovano | |
| 2009/0108642 A1 * | 4/2009 | Hsu | B62K 19/36 297/195.1 |
| 2009/0266656 A1 | 10/2009 | Murakami | |
| 2009/0266657 A1 | 10/2009 | Murakami | |
| 2010/0052377 A1 | 3/2010 | Hsu | |
| 2010/0148412 A1 | 6/2010 | Murakami | |
| 2011/0097139 A1 | 4/2011 | Hsu | |
| 2011/0291446 A1 | 12/2011 | Bourgeois | |
| 2012/0027510 A1 * | 2/2012 | Chen | B62J 1/08 403/374.2 |
| 2012/0098175 A1 | 4/2012 | Wu | |
| 2012/0181824 A1 | 7/2012 | Hsu | |
| 2012/0217686 A1 | 8/2012 | Pelot | |
| 2013/0269655 A1 | 10/2013 | Yamazaki | |
| 2014/0239682 A1 | 8/2014 | Tisue | |
| 2014/0305253 A1 | 10/2014 | Tseng | |
| 2015/0091271 A1 | 4/2015 | Ikeda | |
| 2015/0145294 A1 * | 5/2015 | Kench, III | B62K 19/36 297/215.13 |
| 2015/0191208 A1 | 7/2015 | Hsu | |
| 2015/0232142 A1 | 8/2015 | Shirai | |
| 2015/0232158 A1 | 8/2015 | Bouse | |
| 2017/0096184 A1 | 4/2017 | Hara | |
| 2017/0096185 A1 | 4/2017 | Hara | |
| 2017/0166275 A1 | 6/2017 | Mcpherson | |
| 2017/0225731 A1 * | 8/2017 | Hsu | B62J 1/08 |
| 2017/0341692 A1 | 11/2017 | Shirai | |
| 2018/0015976 A1 | 1/2018 | Hermansen | |
| 2018/0057087 A1 | 3/2018 | Jhou | |
| 2018/0127041 A1 | 5/2018 | Tsai | |
| 2019/0039680 A1 | 2/2019 | Angell | |
| 2019/0263464 A1 | 8/2019 | Staples | |
| 2019/0283827 A1 * | 9/2019 | Shipman | B62J 43/23 |
| 2019/0300088 A1 * | 10/2019 | Jordan | F16B 2/065 |
| 2019/0301497 A1 | 10/2019 | Jordan | |
| 2019/0308681 A1 | 10/2019 | Staples | |
| 2020/0023918 A1 | 1/2020 | Shirai | |
| 2020/0070913 A1 | 3/2020 | Staples | |
| 2020/0140029 A1 | 5/2020 | Shipman et al. | |
| 2020/0247492 A1 | 8/2020 | Coaplen | |
| 2020/0317282 A1 | 10/2020 | Staples | |
| 2020/0317283 A1 | 10/2020 | Staples | |
| 2021/0179217 A1 | 6/2021 | Staples | |
| 2021/0214031 A1 | 7/2021 | Liao | |
| 2022/0106005 A1 | 4/2022 | Shirai | |
| 2022/0111919 A1 | 4/2022 | Staples | |
| 2022/0153371 A1 | 5/2022 | Tung | |
| 2023/0019338 A1 | 1/2023 | Staples | |
| 2023/0211844 A1 | 7/2023 | Lin | |
| 2023/0322318 A1 | 10/2023 | Staples | |
| 2023/0322319 A1 | 10/2023 | Staples | |
| 2023/0322320 A1 | 10/2023 | Staples | |
| 2023/0348004 A1 | 11/2023 | Staples | |
| 2024/0109617 A1 | 4/2024 | Staples | |
| 2024/0116587 A1 | 4/2024 | Staples | |
| 2024/0262443 A1 | 8/2024 | Staples | |

FOREIGN PATENT DOCUMENTS

| | | |
|---|---|---|
| EP | 2657113 | 10/2013 |
| EP | 3196107 A1 | 7/2017 |
| EP | 3348465 | 7/2018 |
| FR | 2409182 A1 | 6/1979 |
| GB | 2506465 | 4/2014 |
| TW | 201219256 A | 5/2012 |
| TW | M451292 U | 4/2013 |
| TW | M510270 U | 10/2015 |

(56) References Cited

FOREIGN PATENT DOCUMENTS

| TW | 201545930 | A | 12/2015 |
|---|---|---|---|
| TW | M513153 | | 12/2015 |
| TW | M517710 | U | 2/2016 |
| TW | I562922 | | 12/2016 |
| TW | 201730032 | | 9/2017 |
| TW | 201801969 | A | 1/2018 |
| TW | M562805 | | 7/2018 |
| TW | M575784 | U | 3/2019 |
| WO | 2016029301 | | 3/2016 |

OTHER PUBLICATIONS

Notice of third party opinion art submission made to TW IPO dated Sep. 1, 2021 in related ROC (Taiwan) Pat. Appln. No. 109111138.
Translation of Office action issued Mar. 3, 2022 in related ROC (Taiwan) Pat, Appln, No. 109111138.
Translation of Office action issued Nov. 17, 2021 in related ROC (Taiwan) Pat, Appln, No. 109111138.
A webpage entitled "Model: 2017 LEV/LEV 272" showing product specifications and figures of a bicycle seat tube provided by Kind Shock Hi-Tech Co., Ltd. and downloadable from the Wayback Machine at https://web.archive.org/web/20170610095807/kssuspension.com/wp-content/uploads/2016/12/2017-Lev-drawing.pdf, available at least as early as Jun. 10, 2017.
A webpage entitled "Model: LEV 272" showing an exploded view of a bicycle seat tube provided by Kind Shock Hi-Tech Co., Ltd. and downloadable from the Wayback Machine at https://web.archive.org/web/20170629100108/http://kssuspension.com/wp-content/uploads/2015/12/LEV-272.PDF, available at least as early as Jun. 10, 2017.
Contact SL Switch Seatpost. Online at <https://www.giant-bicycles.com/ca/contact-sl-switch-seatpost> 2019.
RASE Components, LLC Launches The Mamba Rapid Adjust Seatpost. Online at https://www.pinkbike.com/news/rase-mamba-rapid-adjust-post-2008.html 2019.
2018 LEV dropper post drawings from Kind Shock Hi-Tech Co., dated Jan. 4, 2018.
Mad Suspension Manic Drop Post, information found onine at https://www.xfusionshox.com/products_detail/44.htm 2020.
Fox Transfer Hydraulic Infinite Adjust Seat Post, information found online at https://www.ridefox.com/family.php?m=bike&family=seatpost 2020.
KS Suspension LEV Intergra dropper post, information found online at https://www.kssuspension.com/product/lev-integra/ 2020.
9point8 The Fall Line dropper post, information found online at https://www.9point8.ca/index.php?route=product/product&path=42&product_id=213 2020.
Crankbrothers Kronolog Adjustable Seat Post. Online at <https://www.pinkbike.com/news/Crankbrother-Kronolog-Adjustable-Seat-Post.html> 2019.
Third Party Submission of Prior Art on Jan. 28, 2022 in related Canadian application No. 3,077,761.
Office Action (Non-Final Rejection) dated Jan. 25, 2024 for U.S. Appl. No. 18/347,864 (pp. 1-5).
Office Action (Notice of Allowance and Fees Due (PTOL-85)) dated Feb. 23, 2024 for U.S. Appl. No. 17/959,258 (pp. 1-15).
Office Action (Notice of Allowance and Fees Due (PTOL-85)) dated Mar. 14, 2024 for U.S. Appl. No. 17/949,587 (pp. 1-4).
Office Action (Notice of Allowance and Fees Due (PTOL-85)) dated Mar. 27, 2024 for U.S. Appl. No. 18/347,864 (pp. 1-8).
Office action issued on TW112111622 on Apr. 8, 2024.
Office action issued on TW112129711 on May 14, 2024.
Office Action (Notice of Allowance and Fees Due (PTOL-85)) dated May 24, 2024 for U.S. Appl. No. 18/347,864 (pp. 1-2).
Office Action (Notice of Allowance and Fees Due (PTOL-85)) dated May 23, 2024 for U.S. Appl. No. 18/344,452 (pp. 1-7).
Office Action (Notice of Allowance and Fees Due (PTOL-85)) dated May 30, 2024 for U.S. Appl. No. 17/959,258 (pp. 1-4).
Office Action (Notice of Allowance and Fees Due (PTOL-85)) dated Jun. 27, 2024 for U.S. Appl. No. 18/347,864 (pp. 1-2).
Search Report dated May 10, 2024 for Taiwanese Application 112129711.
Cunningham, Richard "OneUp Components' Travel-Adjustable Dropper Post—First Ride"; online article available Apr. 18, 2018 at https://www.pinkbike.com/news/oneup-components-travel-adjustable-dropper-post-first-look.html.
"OneUp Announces Droppers in Every Length from 100mm to 210mm" online article available Apr. 11, 2019 at https://www.pinkbike.com/news/oneup-announces-droppers-in-every-length-from-100mm-to-210mm.html.
"OneUp Announces New V3 Dropper Post" online article available at Jan. 16, 2024 https://www.pinkbike.com/news/oneup-announces-new-v3-dropper-post-2024.html.
Bike Yoke Revive 1.0—Aug. 17, 2016; online article available at https://enduro-mtb.com/en/bikeyoke-revive-dropper-post-bleed-button/.
Bike Yoke Devine SL (2018)—available to the public as of Oct. 23, 2018 online at https://bikeyoke.com/en/divine-sl/divsl-80-309-0-0.
Kind Shock Hi-Tech Co., Ltd., Model:LEV (2012-2018).
Kind Shock Hi-Tech Co., Ltd., Model:LEV Integra (2016-2018).
Kind Shock Hi-Tech Co., Ltd., Model:LEV Integra (A12) (2019-2020).
Kind Shock Hi-Tech Co., Ltd., Model:LEV-C221 (2019-2020).
Cunningham, Richard "OneUp Components' Travel-Adjustable Dropper Post—First Ride"; online article available Apr. 18, 2018 at https://www.pinkbike.com/news/oneup-components-travel-adjustable-dropper-post-first-look.html.
RockShox Reverb Review, article available online as of Nov. 30, 2011, at https://www.pinkbike.com/news/rockshox-reverb-review-2011.html.
BikeYoke Revive Dropper Post Reviewed, article available online as of Feb. 5, 2019 at https://nsmb.com/articles/bikeyoke-revive-dropper-post-reviewed/.
Fox Transfer Dropper Seat Post—Review, article available online as of Jun. 7, 2016 at https://www.pinkbike.com/news/fox-transfer-dropper-seat-post-review-2016.html.
OneUp Components Press Release entitled "OneUp Components Dropper Post", dated Apr. 15, 2018, 9 pages, retrieved at <https://www.vitalmb.com/news/press-release/0 NEU P-CO M PONE NTS-D ROPP E R-POST,2096#:-: text=The&world's % 20shortest, %20long% 2otravel%20dropper> (Year: 2018).
OneUp Components Vimeo video and description entitled "OneUp Components Dropper Post Shim Install", dated May 16, 2018, 1 page plus 26 pages of video screenshots, retrieved at <https://vimeo.com/270135438> (Year: 2018).
Office Action dated Sep. 28, 2024 for U.S. Appl. No. 18/134,192 (pp. 1-45).
Decision of the Intellectual Property Office issued in relation to Taiwan patent application No. 112129235, issued Aug. 30, 2024 (English translation only).
Translation of office action issued on Taiwana application No. 112129711, mailed May 13, 2024 (English translation only, 3 pages).
Decision of rejection issued by the Taiwan Intellectual Property Office on Dec. 10, 2024, in relation to application No. 11212977 (with English translation, 7 pages).

* cited by examiner

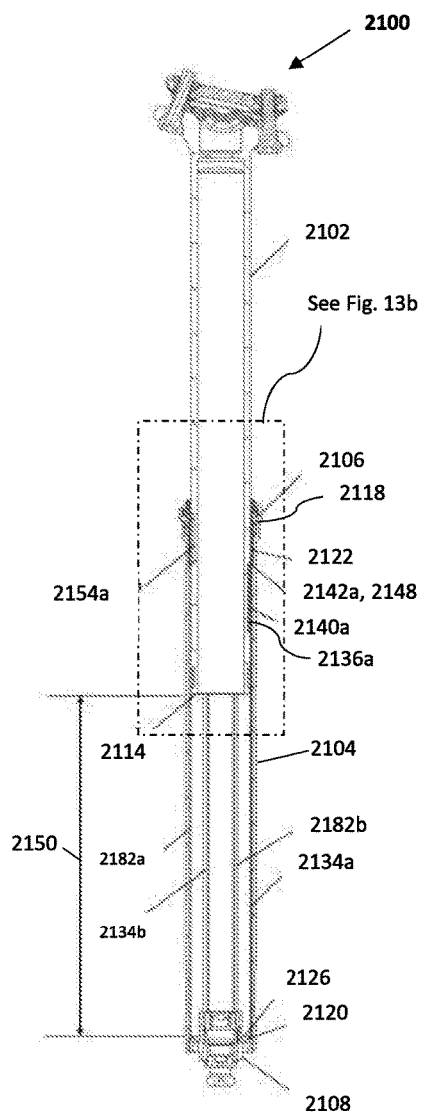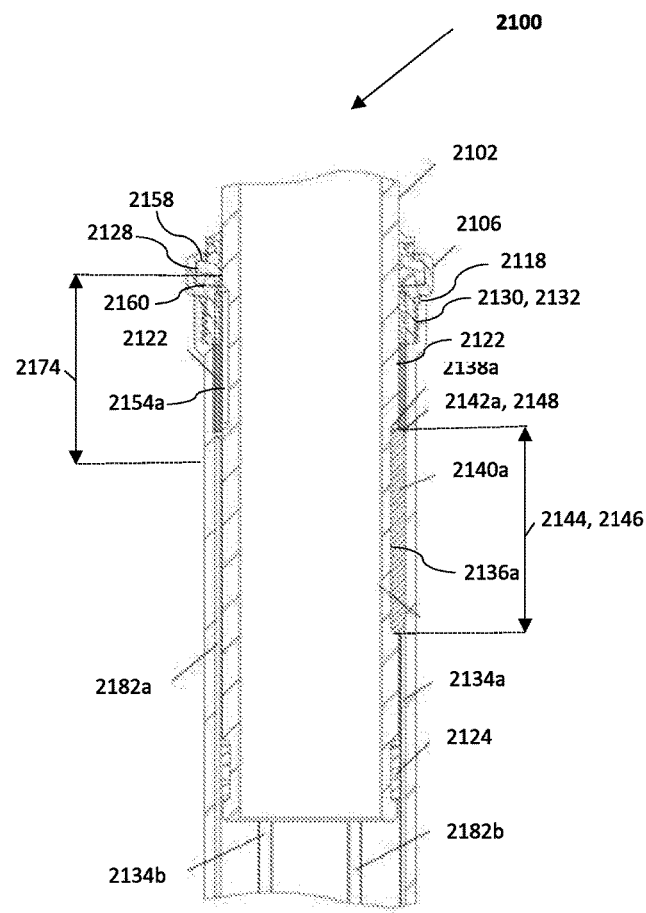
FIG. 13a
FIG. 13b

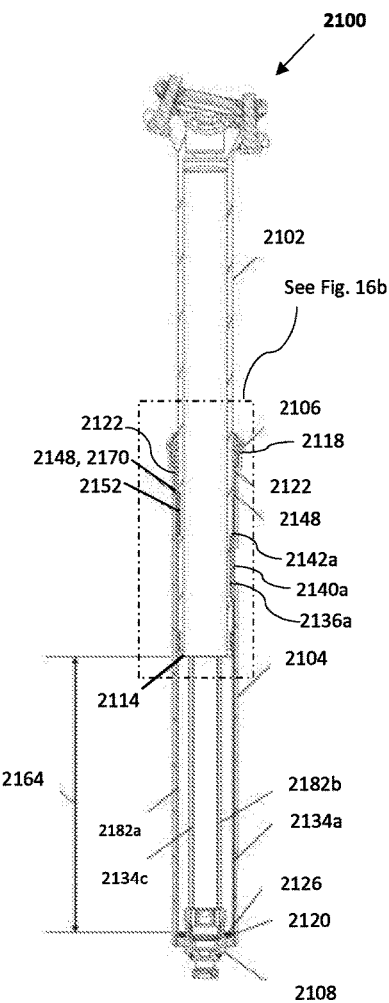
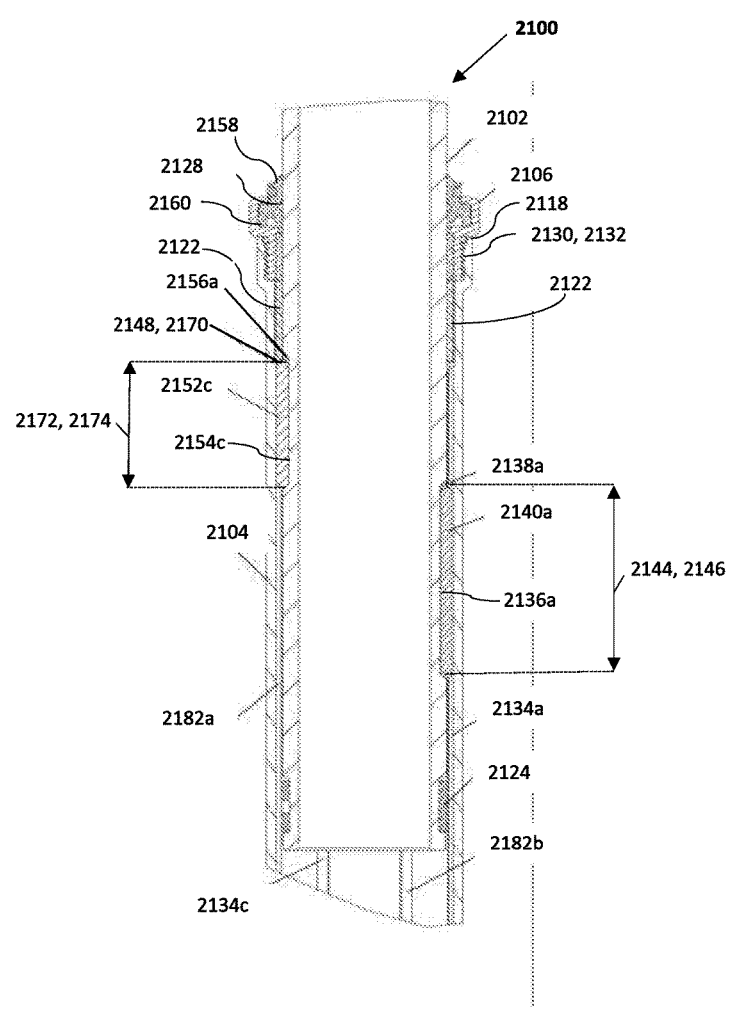
FIG. 16a
FIG. 16b

BICYCLE SEAT POST TRAVEL ADJUSTMENT ASSEMBLY

CROSS-REFERENCE TO RELATED APPLICATION

The present application is a continuation of U.S. patent application Ser. No. 16/555,877, filed Aug. 29, 2019, which itself claims the benefit under 35 U.S.C. § 138(e) of United States provisional patent application Ser. No. 62/725,580 filed on Aug. 31, 2018, and U.S. provisional patent application Ser. No. 62/830,405 filed on Apr. 6, 2019, the entirety of these applications being hereby incorporated by reference.

FIELD OF THE INVENTION

In one of its aspects, the present disclosure relates to a bicycle seat post assembly, and in particular to a bicycle seat post assembly in which the travel distance of the post can be adjusted.

INTRODUCTION

Adjustable bicycle seat posts can provide a variety of seat height options to riders. To enable riders to adjust the height of their seat post while riding, so-called "dropper" seat posts have been developed. Dropper seat posts are telescopic posts that allow the rider to change the height of their seat without having to stop and manually adjust the mechanically tightened seat post collar. A typical dropper seat post allows a rider to extend and retract a portion of their seat post while in motion to provide a high and low seat position, respectively.

Taiwan patent publication no. TW201801969 discloses a casing gap filling structure for a bicycle seat tube, which comprises a casing set having an outer tube and an inner tube which are sleeved onto each other and move linearly. A rotation constraining set is arranged between the inner tube and the outer tube and is provided with a first constraining groove arranged on the inner diameter edge of the outer tube and a second constraining groove arranged on an outer diameter edge of the inner tube. The first and second constraining grooves form a constraining space together, and at least one constraining member made of a metal material is accommodated in the constraining space and capable of conducting synchronous linear displacement with the inner tube. A gap filler set is disposed in the constraining space and provided with at least one constraining member made of a plastic material. The gap filler set and the metal constraining member respectively overlap with each other in the constraining space along the axial direction of the inner and outer tubes, and the plastic constraining member fills the constraining space so as to eliminate the gaps among the plastic constraining member and the first and second constraining grooves. In this way, the rotation constraining set and the gap filler set are used to achieve the dual function of constraining the rotation and eliminating the gaps between the inner tube and the outer tube at the same time. The manufacturing cost of the filling structure is low because the overall components are simple and easy to be assembled quickly. Further, the gaps among the components generated by the fit tolerance and the manufacturing tolerance are reduced with no requirement of tight rotation actions. The automatic filling function is thus achieved and compatible with the lifting seat tube and the suspension seat tube.

U.S. Pat. No. 9,688,331 discloses a bicycle seat post assembly, which includes first and second tubes that are telescopically arranged, a fluid chamber that includes a compressible fluid to generate a force to expand the first and second tubes relative to each other, and a positioning structure. The positioning structure includes a support member on one of the first tube and the second tube, a positioning member that pivots about an axis between a first position and a second position, a control unit, which is connected to the positioning member to move the positioning member between the first position and the second position, and a position maintaining member, which is provided on the other of the first tube and the second tube. The position maintaining member includes an engaging portion that engages with the positioning member to maintain a positional relationship between the first and second tubes.

U.S. Pat. No. 8,079,772 discloses an adjustable height seat post for bicycles that comprises an inner tube slidably contained within an outer tube which supports a bicycle seat. The outer tube clamps into a bicycle frame and contains a spring which acts to force the inner tube upward. The inner tube is allowed longitudinal movement within the fixed outer tube via a locking mechanism that forces ball bearings into pockets or channels on the inner tube. The locking mechanism can be remotely activated with a handlebar mounted lever or manually with a seat post mounted lever.

US patent publication no. 2015/0232158 discloses a bicycle seat post assembly that includes a first cylinder, a second cylinder, and a positioning structure. The second cylinder is configured to be telescopically received in the first cylinder. The positioning structure is configured to relatively position the first cylinder and the second cylinder. The positioning structure is configured to switch a state of the bicycle seat post assembly among a first adjustable state and a second adjustable state. In the first adjustable state, a positional relationship between the first cylinder and the second cylinder is continuously adjustable within a first adjustable position range. In the second adjustable state, the positional relationship between the first cylinder and the second cylinder is continuously adjustable within a second adjustable position range different from the first adjustable position range.

SUMMARY

In recent years, "dropper" seat posts have become more desirable. It is advantageous to lower a bicycle seat as far as possible when riding through technical terrain to allow the rider to change their body position or bend their knees deeply without contacting the seat.

Shorter riders are often required to use shorter travel dropper posts because there is less distance between the top of the bicycle frame seat tube and the rails of the bicycle seat when at their preferred seat height. This distance is often known as the dropper seat post "collar-to-rail length".

In addition to the travel length of a dropper post (i.e., the vertical travel distance of the post), there is a collar length (i.e., the distance from the top to the bottom of the seat post collar) and a head length (i.e., the distance from the top of the seat tube to the mid-point of the seat clamp). Collar length plus head length is the minimum collar-to-rail distance of a given dropper post and collar length plus travel length plus head length is the maximum collar-to-rail length of a given dropper post.

It is typical for dropper posts to be sold in a variety of non-adjustable travel lengths. For example, a manufacturer may offer stock dropper post models with travel lengths that vary by 20 mm to 25 mm with each model (e.g., 125 mm travel, 150 mm travel, 170 mm travel, etc.). This allows the rider to choose a drop length that correlates to a maximum collar-to-rail length that would be equal to or less than the maximum allowable collar-to-rail length dictated by their height, bicycle frame size, and maximum saddle height requirements. However, if a rider's desired collar-to-rail length falls between two stock travel lengths, the rider may have to opt for the shorter travel length model, thereby buying a post with less travel than they could theoretically fit.

For example, if a rider is slightly too short to fit a stock 150 mm travel post, they would likely select a stock 150 mm post even if a theoretical 152 mm travel post would be more suitable. As a result, 10 mm of potential collar-to-rail length is sacrificed by the rider having to choose a shorter post than would theoretically fit.

There is a general desire to have a dropper post with user adjustable travel so that the post can be tuned to provide the maximum travel length that a given rider needs. For example, if a 170 mm travel post is 10 mm too long, it would be preferable for the rider to reduce the travel to the desired 160 mm instead of having to step all the way down to a 150 mm travel post.

As such, it may be preferable for a manufacturer to offer an increased number of dropper post models with smaller travel length increments (e.g., 120 mm, 130 mm, 140 mm, 150 mm, 160 mm, 170 mm, etc.). However, this may not be economically feasible from a manufacturing standpoint.

It may also be desirable to have a means for providing user adjustable travel in a dropper post that can be installed without the need for the dropper post assembly to be fully disassembled and without the need for tools.

Despite the advances made to date in the development of bicycle seat post assemblies, there is room for improvement to address the above-mentioned problems and shortcomings of the prior art.

It may be an object of the present invention to obviate or mitigate at least one of the above-mentioned disadvantages of the prior art, and to provide a novel bicycle seat post assembly.

The teachings described herein may, in one broad aspect, relate to a bicycle seat post assembly. The bicycle seat post assembly may include (a) a base assembly connectable to a bicycle, the base assembly having an outer tube having an upper end, a lower end spaced apart from the upper end along an assembly axis, and an outer contact member provided toward the upper end of the outer tube; (b) an extension assembly comprising an inner tube having an upper end for connecting to a bicycle seat, a lower end that is telescopically receivable in the outer tube and an inner contact member positioned toward the lower end of the inner tube and slidable with the inner tube within the outer tube, wherein the inner tube is movable relative to the outer tube between a retracted position in which the inner contact member is axially spaced apart from the outer contact member and the lower end of the inner tube is disposed toward the lower end of the outer tube and an extended position in which the inner contact member engages the outer contact member to limit axial extension of the inner tube and the lower end of the inner tube is spaced from the lower end of the outer tube by an extended distance; and (c) a positioning assembly comprising a shim that is attachable to one of the inner tube and the outer tube and is positionable relative to the inner contact member and outer contact member so that when the shim is attached to the one of the inner tube and the outer tube and the inner tube is moving from the retracted position toward the extended position at least one of the shim and the inner contact member engages the outer contact member to limit the axial extension of the inner tube at an intermediate position in which the lower end of the inner tube is spaced from the lower end of the outer tube by an intermediate distance that is less than the extended distance.

Other aspects of the teachings described herein, which may be used in combination with any other aspect, including the broad aspect listed above, may include that the shim is attachable to and moves with the inner tube relative to the outer tube.

The inner tube may comprise an inner sidewall extending between the upper and lower ends and may have an axially extending primary groove segment disposed toward the lower end.

The inner contact member may comprise an axially extending, elongate pin that is partially nested within the primary groove segment.

The inner sidewall may further comprise an auxiliary groove segment and the shim may be attachable to the inner tube by being partially nested within the auxiliary groove.

The auxiliary groove segment may be substantially parallel to the primary groove segment.

The auxiliary groove segment may be laterally offset from the primary groove segment about a perimeter of the inner sidewall.

The auxiliary groove segment may be laterally aligned with and may optionally be co-axial with the primary groove segment.

The auxiliary groove segment and primary groove segment may both be part of a common recess and may be contiguous with each other.

The inner contact member may be partially received within the primary groove segment and the auxiliary groove segment when the shim is not disposed within the auxiliary groove segment and may be repositionable within the common recess relative to the inner tube. The inner tube may be configured so that the inner contact member is movable upwardly relative to the inner tube sidewall to a raised position and when the shim is attached the shim may be positioned within the common recess adjacent a lower end of the inner contact member to support the inner contact member in the raised position and the inner contact member may engage the outer contact member when the inner tube is in the intermediate position.

The auxiliary groove segment may extend at least partially axially above the primary groove segment so that when the shim is partially nested within the auxiliary groove the shim is at least partially axially between the inner contact member and the outer contact member and the shim may engage the outer contact member when the inner tube is in the intermediate position.

The inner contact member may have an axial upper surface that engages the outer contact member when the inner tube is in the extended position. The shim may comprise an axial upper surface that engages the outer contact member and an axial lower surface that engages the axial upper surface of the inner contact member when the shim is attached and the inner tube is in the intermediate position.

The base assembly may comprise a bushing toward the upper end of the outer tube to stabilize the movement of the inner tube. A lower surface of the bushing may comprise the outer contact member.

Upper ends of both the primary groove segment and auxiliary segment may remain within an interior of outer tube when the inner tube is in the extended position.

The upper end of the outer tube may comprise a sealing member configured to seal against the inner tube to seal an interior of the outer tube. The upper ends of both the primary groove segment and auxiliary segment may be spaced below an upper edge of the sealing member when the inner tube is in the extended position.

The upper ends of both the primary groove segment and auxiliary segment may be spaced below an opposing lower edge the sealing member when the inner tube is in the extended position.

The outer contact member may be removable and the inner tube may then be movable to a maintenance position relative to the outer tube in which the lower end of the inner tube remains within the outer tube and is spaced from the lower end of the outer tube by a maintenance distance that is greater than the extended distance and the auxiliary groove segment is at least partially exposed and the shim is attachable to the inner tube when the inner tube is in the maintenance position.

The shim may be removable from inner tube and when the shim is removed the inner tube may again be movable to the extended position.

The inner contact member may comprise an anti-rotation surface that extends radially beyond from the inner sidewall and is slidably received within a corresponding axially extending channel provided in an inner surface of the outer tube. Rotation of the inner tube about the assembly axis may be inhibited by engagement between the anti-rotation surface and the channel.

The positioning assembly may further comprise a second shim that is attachable to one of the inner tube and the outer tube and is positionable relative to the inner contact member and outer contact member so that when the second shim is attached to the one of the inner tube and the outer tube and the inner tube is moving from the retracted position toward the extended position at least one of the shim, the second shim, and the inner contact member engaging the outer contact member to limit the axial extension of the inner tube at a secondary intermediate position in which the lower end of the inner tube is spaced from the lower end of the outer tube by a secondary intermediate distance that is less than the extended distance and the intermediate distance. The second shim may be attachable independently from the shim.

A control assembly may be configured to enable a user to selectably trigger movement of the inner tube between the extended and retracted positions.

Thus, the present inventors have developed a bicycle seat post assembly with a user adjustable travel length. The travel length of the post can be adjusted using one or more insertable shims, which can modify the travel length of the post in smaller incremental amounts than may be available in standard stock dropper post models. This may allow for riders to better customize the maximum available drop of their seat post to their height, bicycle frame size, and/or saddle height requirements. In addition, the travel length of the present bicycle seat post assembly may be modified without the need to fully disassemble the post assembly and without the need for tools.

To the knowledge of the inventors, a bicycle seat post assembly with such a combination of features is heretofore unknown.

Other advantages of the invention will become apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which:

FIG. 2a is a side cross-sectional view of the seat post assembly of FIG. 1;

FIG. 2b is an enlarged view of a portion of FIG. 2a;

FIG. 11a is a side cross-sectional view of another example of a seat post assembly, with the inner tube of the seat post assembly in another example of an intermediate position;

FIG. 11b is an enlarged view of a portion of FIG. 11a.

FIG. 12 is a partially exploded perspective view of the seat post assembly of FIG. 11a.

FIG. 13a is a side cross-sectional view of another example of a seat post assembly, wherein with the inner tube of the seat post assembly in an extended position;

FIG. 13b is an enlarged view of a portion of FIG. 13a;

FIG. 14 is a side cross-sectional view of the seat post assembly of FIG. 13a, with the inner tube of the seat post assembly in a retracted position;

FIG. 15 is a partially exploded perspective view of the seat post assembly of FIG. 13a;

FIG. 16a is a side cross-sectional view of the seat post assembly of FIG. 13a, wherein a shim has been inserted;

FIG. 16b is an enlarged view of a portion of FIG. 16a;

DETAILED DESCRIPTION

Figure 1:
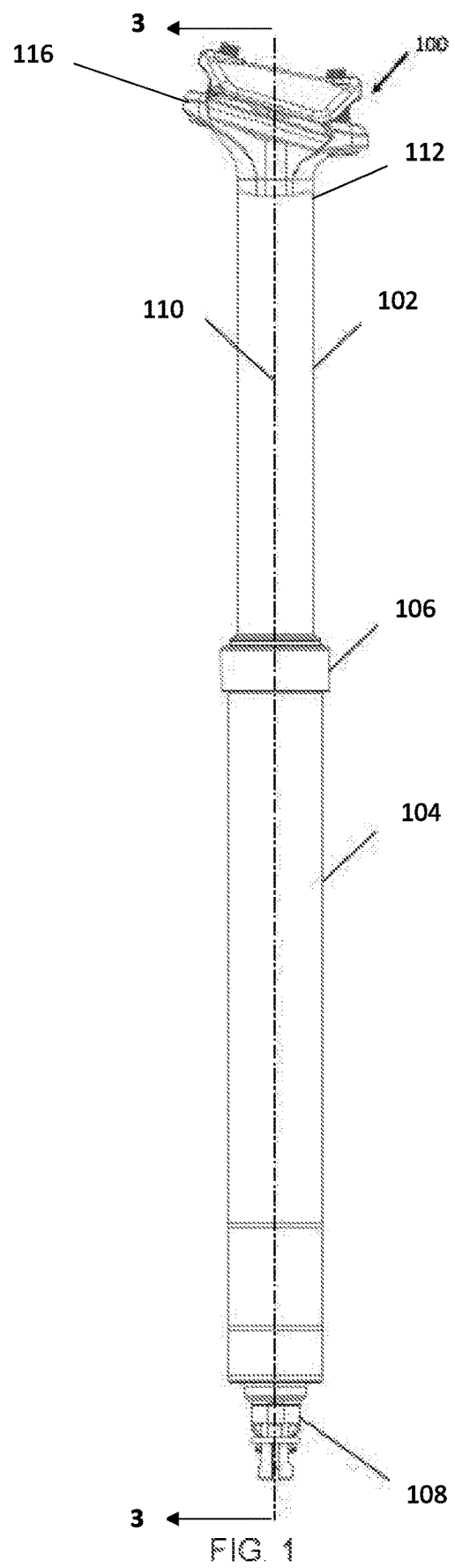
FIG. 1 is a side view of one example of a seat post assembly, wherein the inner tube of the seat post assembly is in an extended position.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Bicycle dropper seat posts allow a rider to change the height of their seat while riding without having to stop and adjust a mechanically tightened seat post collar. Dropper seat posts are available in different sizes, having different lengths of travel and different minimum and maximum seat heights. In some circumstances, a rider's desired maximum travel length may fall between two stock travel lengths. In such cases, the rider may have to opt for the shorter travel length model. Providing a seat post assembly in which a rider can modify the travel length of a dropper seat post may assist a rider in maximizing the available travel or "drop" of their seat post.

Preferably, a seat post assembly can be provided that can allow a user to modify its travel length, from travelling between a stock retracted position and a stock (or factory determined) extended length to instead travelling between the retracted position and an intermediate position. Preferably such modification may be done by the user without requiring a significant disassembly of the seat post assembly and/or without the need for special tools or the like. This may help facilitate users doing their own modifications of the seat post assemblies, rather than requiring the services of a skilled technician. To help facilitate this, the modification to the seat post assembly may be done using modification hardware (such as an insertable shim as described herein or other analogous hardware) rather than requiring a user to access or modify aspects of the actuating device that is inside the seat post assembly to provide the biasing force to urge the inner post into its extended position. For example, it may be preferable for the seat assembly to be modified by inserting relatively simple shims, rather than requiring the user to access an internal locking air spring, coil spring, pneumatic cylinder, hydraulic cylinder or other type of biasing apparatus that is provided within the seat post assembly.

Optionally, the modification to the seat post assembly (so that it can be limited to the intermediate position) can be temporary, such that the user could "un do" the modification if it was desired to return the seat post assembly to its original, extended configuration.

Referring to FIGS. 1-8, one example of a bicycle seat post assembly 100 is shown. The seat post assembly 100 has an inner tube 102, outer tube 104, a collar 106, an actuator 108, and a locking air spring (to provide the motivating force to raise and lower the inner tube 102 but not shown in these drawings so that the details of the tubes can be seen more clearly). The outer tube 104 is configured to telescopically, slidingly receive the inner tube 102 to allow the assembly 100 to change height.

In this example, the inner tube 102 extends axially (i.e. in a direction parallel to axis 110) between an upper end 112 and a lower end 114. The upper end 112 is configured to receive a seat attaching assembly, such as seat clamping apparatus 116. A bicycle seat (not shown) can be attached to the seat clamping apparatus 116 such that it can move up and down with the inner tube 102 when the assembly 100 is in use.

Figures 2A, 2B:
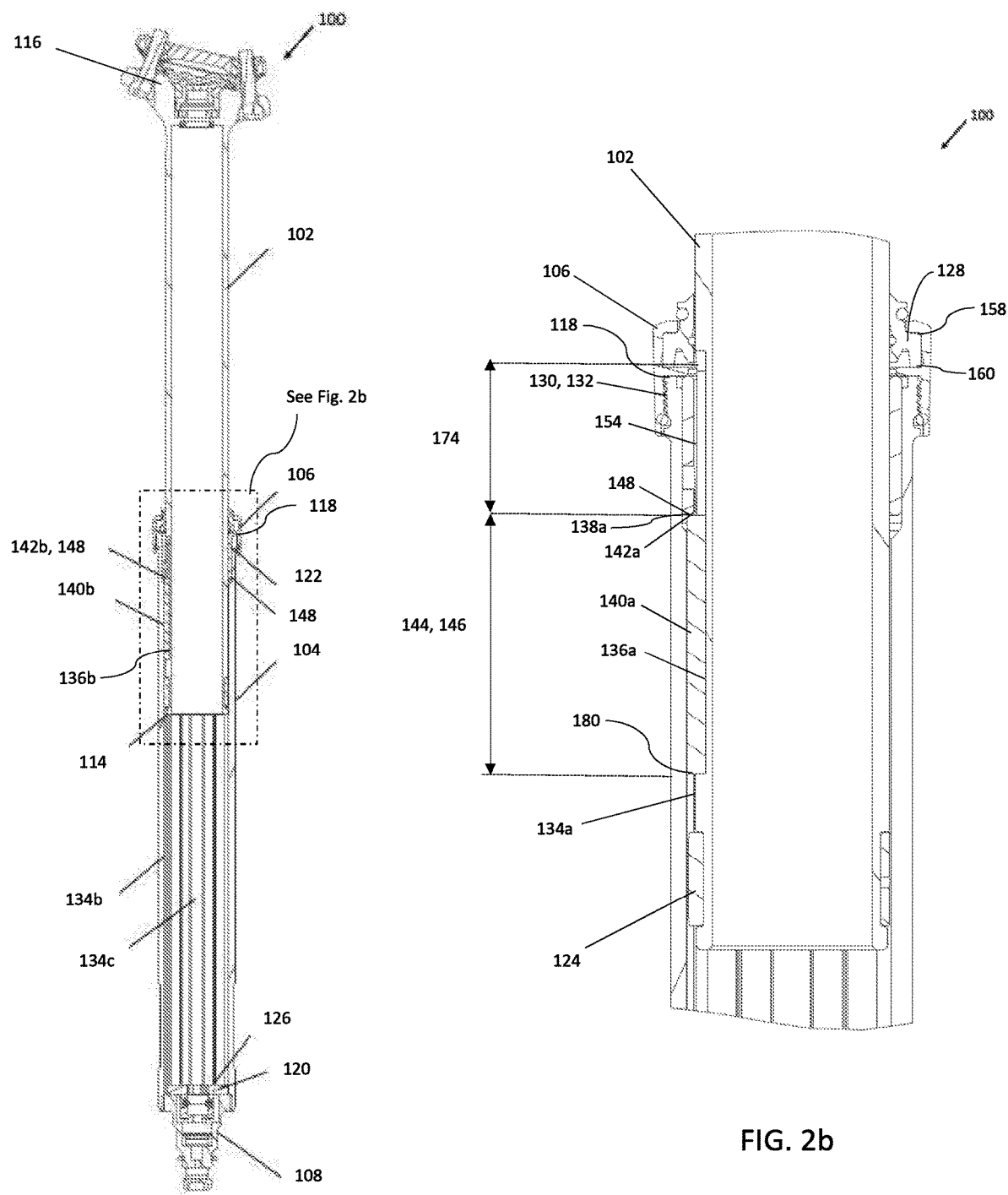
Figure 3:
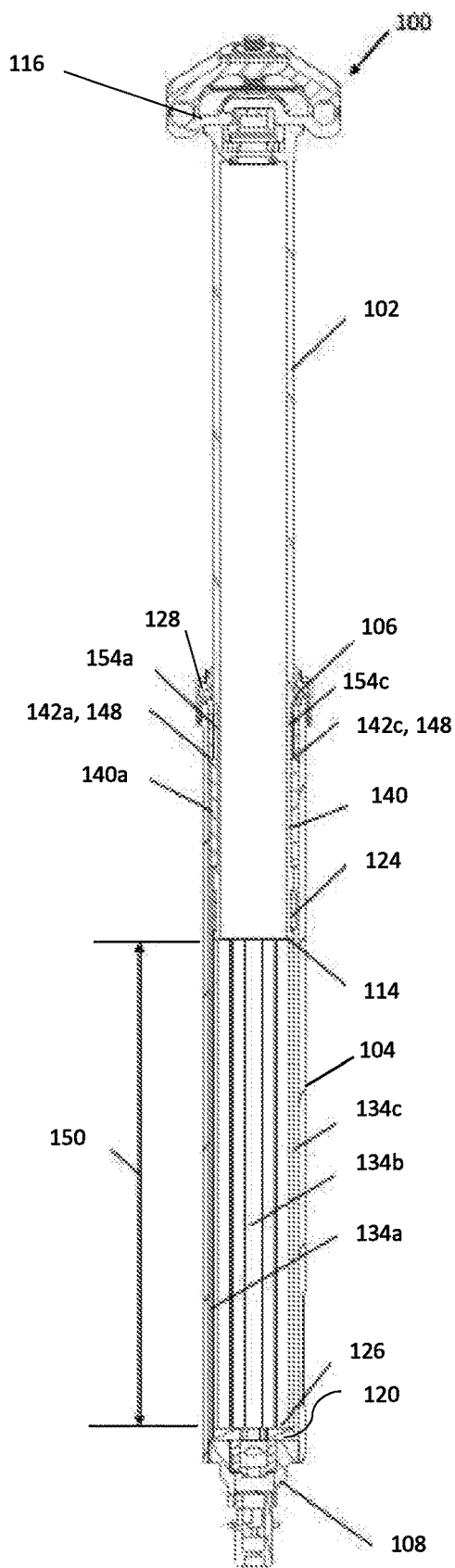
FIG. 3 is a cross-sectional view of the seat post assembly of FIG. 1, taken along line 3-3.
Figure 4:
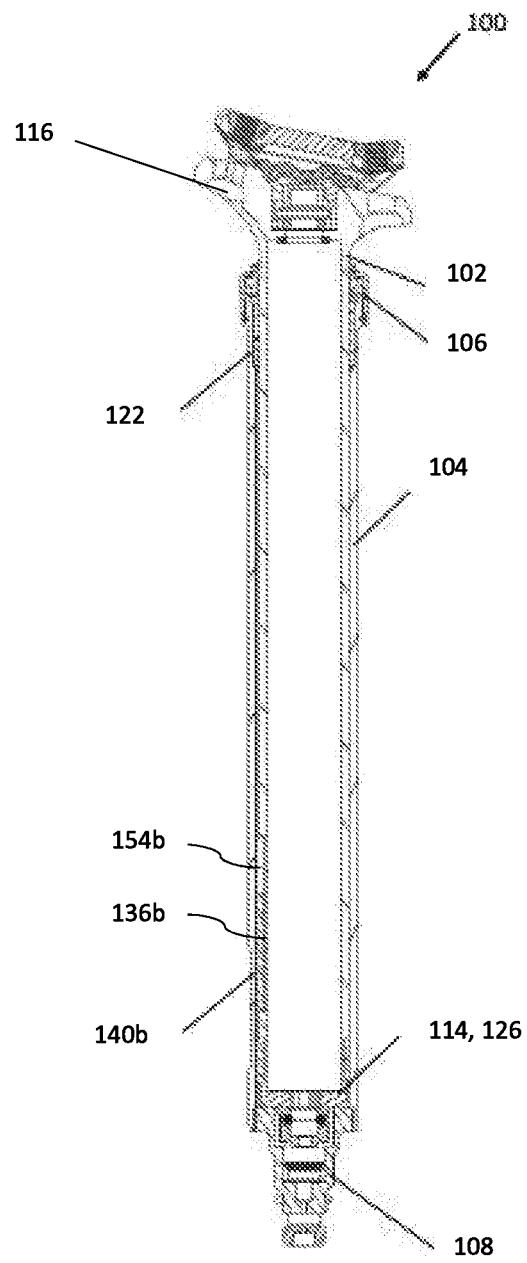
FIG. 4 is a side cross-sectional view of the seat post assembly of FIG. 1, with the inner tube of the seat post assembly in a retracted position.
Figure 5:
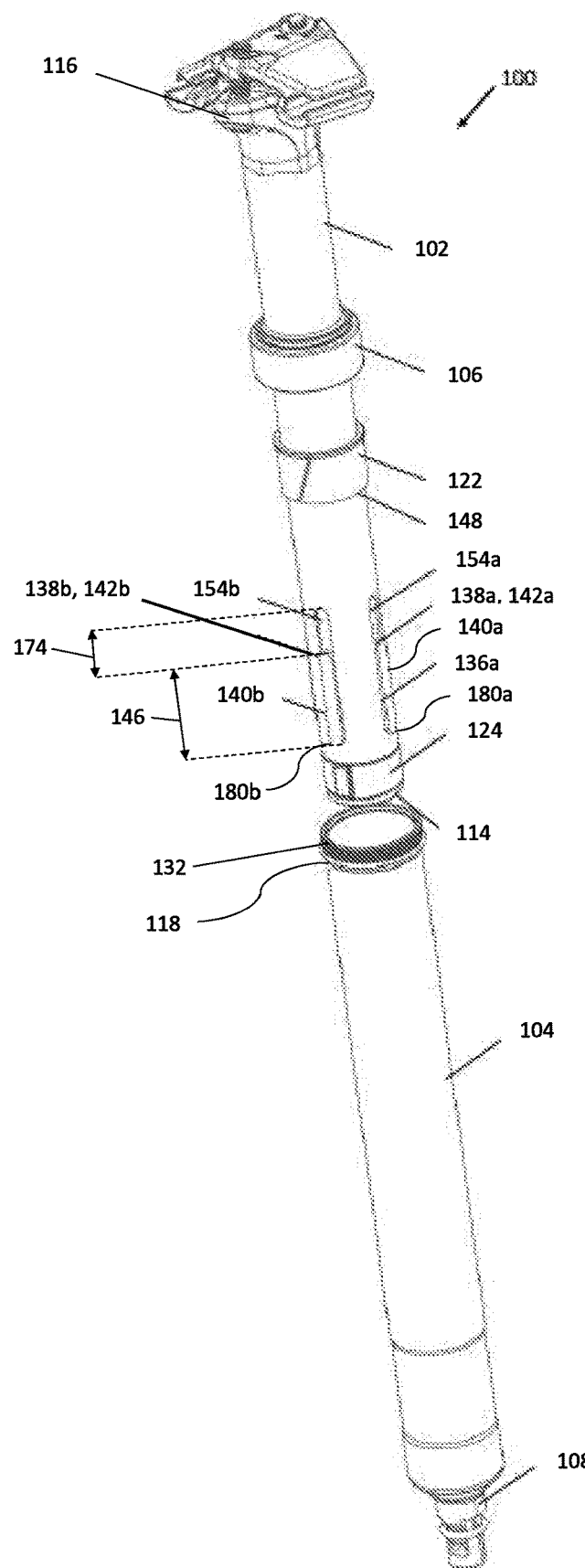
FIG. 5 is a partially exploded perspective view of the seat post assembly of FIG. 1.

The outer tube 104 also extends axially between a respective upper end 118, that is open to receive the inner tube 102, and a lower end 120. The outer tube 104 is preferably configured to telescopically receive at least a portion of the lower end 114 of the inner tube 102, such that the inner tube 102 is axially slidable relative to the outer tube 104 between an extended position (as illustrated in FIGS. 1-3) and a retracted position (as illustrated in FIG. 4). The degree of overlap between the inner tube 102 and the outer tube 104 when the inner tube 102 is extended can be selected so that the assembly 100 can provide a desired degree of resistance to tilting of the inner tube 102. A bushing 122 toward the upper end of the outer tube 104 is used to help constrain movement of the inner tube 102 to the substantially axial direction and resist tilting of the inner tube 102. In some embodiments, the inner tube 102 also has a bushing 124 toward the lower end of the inner tube 102 to help provide further stability.

To help facilitate relatively easy sliding of the inner tube 102 relative to the outer tube 104, a lubricant, such as oil or grease, may be provided between the inner tube 102 and outer tube 104. Preferably, to help prevent leakage and/or fouling of such lubricants the seat post assembly can include a sealing assembly that can seal the upper end of the outer tube 104 to help keep dirt and debris from entering the outer tube 104, while still permitting sliding of the inner tube 102. In this example, the sealing assembly includes a seal 128 that is provided toward the upper end 118 of the outer tube 104 to slidingly seal against the outer surface of the inner tube 102. This can help prevent sand, dirt, and other debris from entering the interior of the outer tube 104 or otherwise fouling or contaminating the interior of the outer tube 104.

The lower end 120 of the outer tube 104 may comprise a bumper 126, configured to help cushion the lower end 114 of the inner tube 102 when the inner tube 102 is in the retracted position. The bumper 126 may be located above the absolute bottom of the outer tube 104 and may comprise a separate rubber piece. When the inner tube 102 is in the retracted position, the lower end 114 of the inner tube is preferably adjacent to, and may optionally abut, the upper surface of the bumper 126.

The collar 106 acts as a cap on the upper end 118 of the outer tube 104. In the illustrated example, the collar 106 has threads 130 that are configured to engage threads 132 on the upper end 118 of the outer tube 104. Unthreading the collar 106 can allow a user to access interior of the assembly 100 for maintenance, inspection, and/or for the insertion or removal of shims as described in more detail herein. This may also help facilitate the positioning of the inner tube 102 in its over-extended, maintenance position that would otherwise be inhibited when the collar 106, and bushings supported therein, are in place. The collar 106 can also contain and support other functional components of the assembly 100, such as the seal 128 and bushing 122 as described in more detail herein.

In addition to the bushing 122, which may help constrain tilting of the inner tube 102, the assembly 100 may include a separate anti-rotation mechanism that can help resist and/or limit rotation of the inner tube 102 relative to the outer tube 104 about the axis 110. This may be of any suitable configuration, including a keyed arrangement, in which an anti-rotation member extending from one of the inner tube 102 and outer tube 104 may be disposed within, and slide along, corresponding channels or tracks on the other of the inner tube 102 and outer tube 104.

In some embodiments, the outer tube 104 may have one or more axial channels 134 along the interior surface of the outer tube 104. The channel 134 may extend from about the lower end 120 of the outer tube 104 to about the upper end of 118 of the outer tube 104. In some embodiments, the channel 134 may not extend the full length of the outer tube 104. In the illustrated example, the lower tube 104 has three axial channels 134a, 134b, 134c; however, the number of channels will vary with the number of anti-rotation members (described below). These channels 134*a-c* are sized to receive complimentary anti-rotation members provided on the inner tube 102, such as those described herein.

In the illustrated example, the inner tube 102 has axially extending primary grooves 136 that are formed in its outer surface. Preferably, primary grooves 136 are not through holes, and do not provide access to the interior of the inner tube 102 but are deep enough to receive and retain other objects/elements. In the illustrated embodiment, the inner tube 102 has three primary grooves 136*a*, 136*b*, 136*c*, circumferentially spaced apart from each other around its perimeter (generally equally spaced in this example). In other embodiments, there may be one, two, or more than three grooves. Each primary groove 136 has an axial upper end 138.

Because primary grooves 136 represent a discontinuity and/or recess from the otherwise generally smooth outer surface of the inner tube 102, extending the inner tube 102 to a position in which primary groove 136 axially overlaps with the seal 128 may interfere with the operation of the seal 128. For example, if they are overlapped then the interior of primary groove 136 may allow some dirt or debris to by-pass the seal 128 and enter the interior of the outer tube 104 and/or contaminate the lubricant. In addition to facilitating a by-pass of the seal 128, sliding contact between the edges/perimeter of primary groove 136 and the sealing surfaces may damage the seal 128. Preferably, the assembly 100 is configured so that primary groove 136 remains axially spaced apart from the seal 128 when the assembly 100 is in use (i.e. when in either its extended or retracted positions). In some embodiments, the axial upper end 138 of primary groove 136 is below the upper end 118 of the outer tube 104 when the inner tube 102 is in the extended position.

To help control the axial extension of the inner tube 102, the assembly 100 may include any suitable extension assembly that can limit the extension of the inner tube 102 at a desired position and restrain the inner tube 102 in its extended position. Preferably, the extension assembly will include complimentary inner and outer contact members that are positioned so as to abut or otherwise engage each other when the inner tube 102 reaches its desired, original extended position. When the inner tube 102 is retracted, the inner and outer contact members may be axially spaced apart from each other.

In the illustrated example, the extension assembly comprises three inner contact members 140*a*, 140*b*, 140*c*, each of which are connected to and slidable with the inner tube 102 relative to the outer tube 104. Each inner contact member 140 is positioned toward the lower end 114 of the inner tube 102 and is slidable with the inner tube 102 within the outer tube 104. Each inner contact member 140 has an upper surface 142. In the illustrated example, the inner contact members 140 are received and partially nested within the primary grooves 136 to attach them to the inner tube 102 while they still extend proud of the surface of the inner tube 102. There is a preferably a loose enough fit to remove or install the inner contact member 140 without tools.

While the present example shows three contact members 140 partially nested in the grooves 136, in other embodiments, the positioning assembly may have one, two, or more than three inner contact members. The inner contact members may be made of any suitable material, including but not limited to metal, plastic, brass, steel, or aluminum. The inner contact member 140 may be sized and shaped to be receivable within primary groove 136 and have an inner contact member length 144 that is less than the primary groove length 146. In the illustrated example, the three inner contact members 140*a*, 140*b*, and 140*c* are elongate rods. In other embodiments, the inner contact member may be one or more pin, slider, rod of round, square or polygonal cross-section, or a series of balls.

The extension assembly also comprises a corresponding outer contact member 148 to engage the inner contact member(s). In the illustrated example, the outer contact member 148 is at least provided by the lower, inner facing surface of the bushing 122. The outer contact member 148 is positioned such that when the inner tube 102 is in the retracted position (as illustrated in FIG. 4), the inner contact member 140 is axially spaced apart from the outer contact member 148. Conversely, when the inner tube 102 is in the extended position (as illustrated in FIGS. 2,3), the inner contact member 140 engages the outer contact member 148, which limits further axial extension of the inner tube 102 relative to the outer tube 104.

Preferably, some of the elements of the extension assembly may also perform other functions in the assembly 100, such as an anti-rotation function (discussed in more detail herein). This may help reduce the total number of parts required in the assembly, which may help reduce its overall size and/or weight. For example, elements of the extension assembly, such as the inner contact member 140, may also form part of an anti-rotation mechanism.

In the illustrated example, the inner contact member 140 is sized and shaped to be received by the primary groove 136 and then extend radially outwardly from primary groove 136 and beyond an outer surface of the inner tube 102. The channel 134 and inner contact member 140 can be configured to permit axial movement between the inner and outer tubes 102, 104, while interference between the sides of the inner contact member 140 and radially extending side faces of the channels 134 will inhibit rotation between the inner and outer tubes 102, 104.

In other embodiments, the anti-rotation member need not include the inner contact member 140 and a separate member may be any suitable size and shape configured to be positioned in the primary groove 136 and be axially slidably received in a corresponding member on the inner surface of the outer tube 104, such as channel 134. For example, the anti-rotation member may be a pin, a slider, or a rod of round, square or polygonal cross-section.

While a single anti-rotation member and channel 134 may be sufficient to limit rotation of the inner tube 102 in some embodiments, it may be preferable to include two or more sets of anti-rotation members and channels 134 to help provide further rotational resistance.

Referring again to FIG. 3, when the inner tube 102 is in the extended position, the lower end 114 of the inner tube 102 is axially spaced apart from the lower end 120 of the outer tube 104 by an extended, first distance 150. The first distance 150 is the seat post travel length of the extended position of the seat post assembly.

A positioning assembly comprising one or more attachable shims may be used to reduce the seat post travel length. In the illustrated example, the shim 152 is attachable to the inner tube 102. In other embodiments, the shim is attachable to the outer tube 104. By inserting a shim 152 into the bicycle seat post assembly 100, the axial extension, or travel length, of the inner tube 102 can be customized by the user.

To help accommodate the shims 152, the positioning assembly may include one or more auxiliary groove segments, that are sized to at least partially radially receive a shim. The auxiliary groove segments may preferably be located on the outer surface of the inner tube 102, or alternatively could be on the inner surface outer tube 104. The shim 152 is attachable to the inner tube 102 or to the outer tube 104 by being partially nested within the auxiliary groove segment. In the illustrated embodiment, the auxiliary groove segment 154 is located on the outer surface of the inner tube 102.

Optionally, the auxiliary groove segment 154 may be located at least partially above or at least partially below the primary groove 136. Like the axial upper end 138 of the primary groove 136, the axial upper end 156 of the auxiliary groove segment 154 remains axially spaced apart from the seal 128 when the assembly 100 is in use, such that the upper end 138 of the primary groove 136 and the upper end 156 of the auxiliary groove segment 154 are spaced below an upper edge 158 of the seal 128 when the inner tube 102 is in the extended position. In some embodiments, the upper end 138 of the primary groove segment 136 and the upper end 156 of the auxiliary groove segment 154 are spaced below an opposing lower edge 160 of the seal 128 when the inner tube 102 is in the extended position.

The auxiliary groove segment may be positioned in any suitable position on the inner tube 102, and in any suitable orientation, to provide a desired mounting location for the shim(s). It may optionally be adjacent and/or continuous with the primary groove segment 136 (which may help simplify manufacturing) or may be separate from the primary groove (which may provide additional flexibility in the placement of the shims). For example, in some embodiments, the auxiliary groove segment may be substantially parallel to the primary groove segment 136. In some embodiments, the auxiliary groove segment may be laterally aligned with the primary groove segment 136. In some embodiments, the auxiliary groove segment may be laterally offset from the primary groove segment 136.

In the illustrated example, the auxiliary groove segment is both parallel to and laterally aligned with the primary groove segment 136, making it substantially aligned with the primary groove. In this arrangement, the auxiliary groove segment 154 and the primary groove segment 136 are generally contiguous with each other and form part of a common recess on the inner tube 102 (see FIG. 5). In embodiments in which the auxiliary groove segment 154 and the primary groove segment 136 are contiguous with each other, the inner contact member 140 can be partially received within the primary groove segment 136 and the auxiliary groove segment 154 at different times while the device is in use, and can be repositionable within the common recess relative to the inner tube, when the shim 152 is not attached to the auxiliary groove segment 154. Such an arrangement may allow the inner contact member 140 to be movable upward or downward within the common recess, thereby changing the portion of the common recess that can function as the auxiliary groove segment 154. This may allow for attachment of the shim 152 either below or above the inner contact member 140 while still having at least substantially the same effect on the extension of the inner tube 102. That is, positioning the combination of the shim 152 and inner contact member 140 within the common recess may arrest the inner tube 102 in the same intermediate position, whether the shim 152 is above the inner contact member 140 and contacts the outer contact member or if the shim 152 is below the inner contact member 140 thereby shifting the inner contact member 140 upward within the common recess to contact the outer contact member.

In the illustrated example, the auxiliary groove segment 154 is on the inner tube 102, and thereby the shim 152 is attachable to the inner tube 102 via the auxiliary groove segment 154. The shim 152 is positionable relative to the inner contact member 140 and outer contact member 148 so that when the shim 152 is attached to the inner tube 102 (as illustrated) or the outer tube 104 (not illustrated), and the inner tube 102 moves from the retracted position toward the extended position, at least one of the shim 152 and the inner contact member 140 engages the outer contact member 148 (i.e. which ever is located closest to the upper end of the inner tube 102) to limit the axial extension of the inner tube 102 at an intermediate position in which the lower end 114 of the inner tube 102 is spaced from the lower end 120 of the outer tube 104 by an intermediate distance that is less than the extended distance.

Optionally, the seat post assembly 100 may be configured so that the shim 152 can be inserted by a user into the auxiliary groove segment 154 without the need to fully disassemble the seat post assembly 100 and without the need for tools (i.e., the shim can be inserted by hand). This may help facilitate insertion of the shim by an end user, rather than a skilled technician, and may help reduce the chances that other parts of the assembly 100 become damaged or otherwise modified during the shim insertion process (or removal process).

In the illustrated example, to insert the shim 152, the collar 106 is unthreaded from the outer tube 104 and slid upwards along the inner tube 102. By removing the collar, the outer contact member 148, seal and other structural features are then free to slide upwards along the inner tube 102. With the outer contact member 148 removed, the inner tube 102 can then be extended upwards beyond its normal extension position to a maintenance position, in which the lower end 114 of the inner tube 102 remains within the outer tube 104 and is spaced from the lower end 120 of the outer tube 104 by a maintenance distance 162 that is greater than the first (i.e., extended) distance 150 (see FIG. 8). In the maintenance position, the auxiliary groove segment 154 is at least partially exposed (and optionally completely exposed) and the shim 152 can be attached to the inner tube 102 (or outer tube 104). With the shim 154 in position the seat post assembly 100 can be re-assembled.

Figure 6:
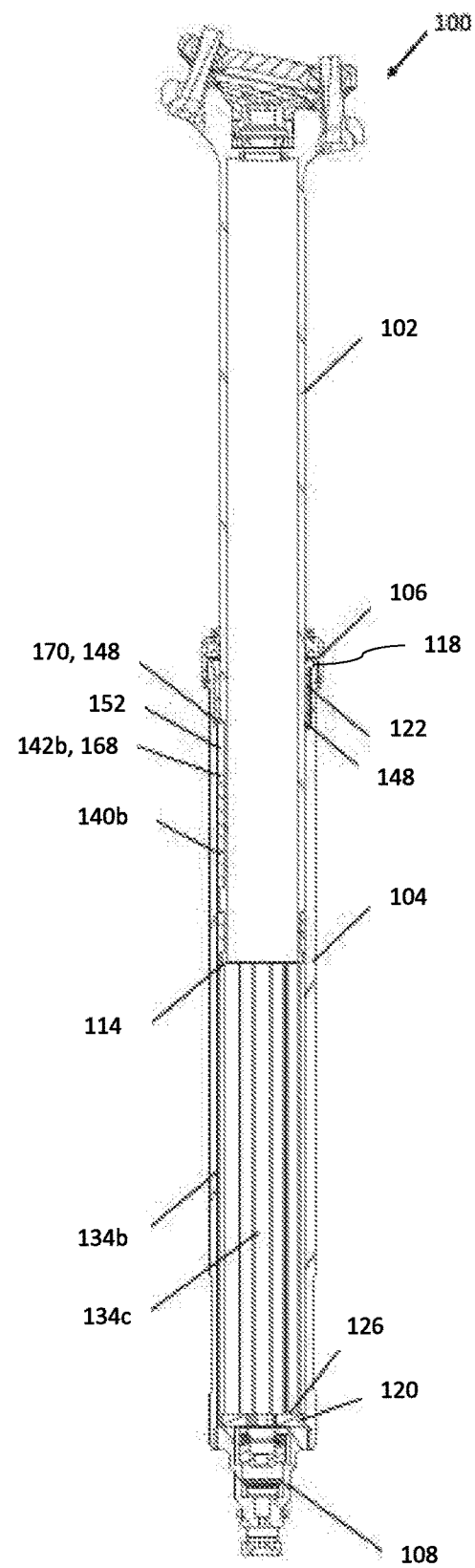
FIG. 6 is a side cross-sectional view of the seat post assembly of FIG. 1, with the inner tube of the seat post assembly in an intermediate position.
Figure 7:
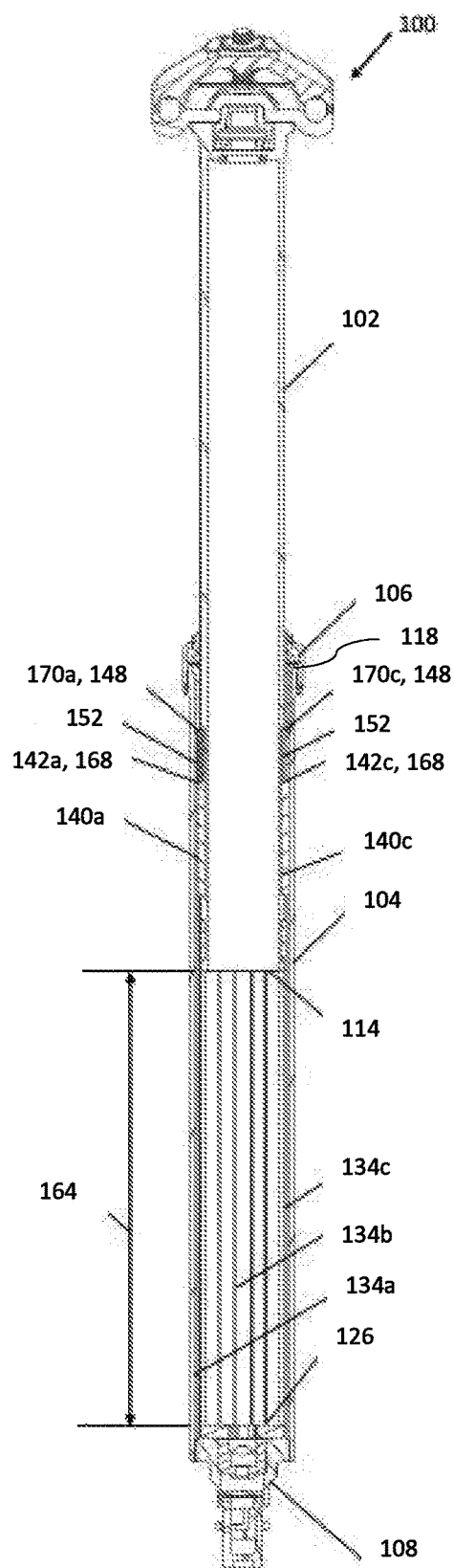
FIG. 7 is a front cross-sectional view of the seat post assembly of FIG. 6.
Figure 8:
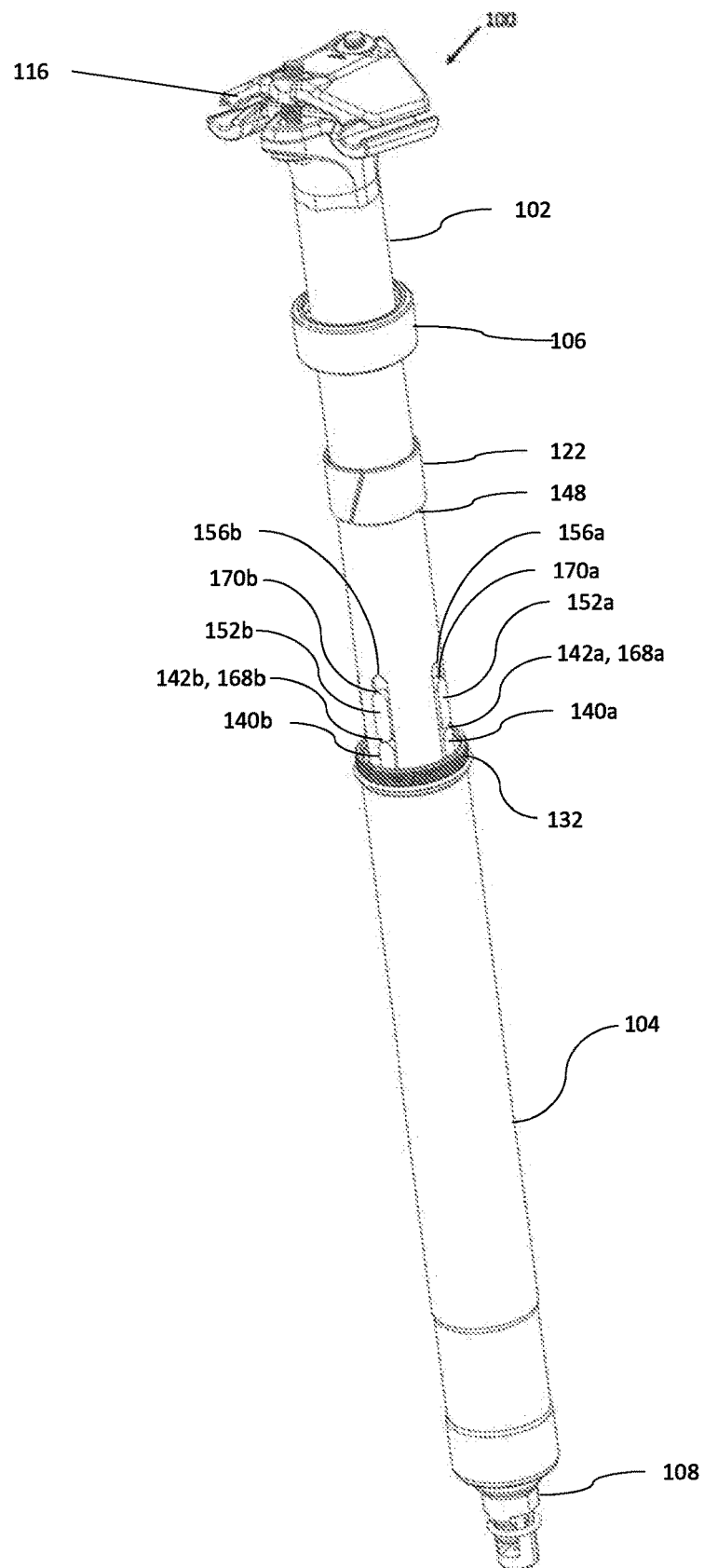
FIG. 8 is a partially exploded perspective view of the seat post assembly of FIG. 6.

FIGS. 6-8 illustrate the bicycle seat post assembly with the addition of shims 152a, 152b, 152c. In other embodiments, there may be one, two, or more than three shims. In the illustrated example, shim 152 is positioned axially between the inner contact member 140 and the outer contact member 148 to limit the axial extension of the inner tube 102. The shim 152 is configured so that when the inner tube 102 moves from the retracted position towards the extended position, the shim 152 is engaged by and maintains an axial gap between the inner contact member 140 and the outer contact member 148, thereby limiting the axial extension of the inner tube 102 to an intermediate position that is between the retracted position and the extended position. In the intermediate position, the lower end 114 of the inner tube 102 is axially spaced apart from the lower end 120 of the outer tube 104 by a second distance 164. The second distance 164 is the seat post travel length of the intermediate position of the seat post assembly. The second distance 164 is less than the first distance 150 of the seat post (i.e., with no shim inserted and the seat post assembly in the extended position).

In some embodiments, the shim 152 may be positionable adjacent to the inner contact member 140. In some embodiments, the shim 152 may be positionable adjacent to the outer contact member 148. In some embodiments, the shim 152 may be positionable between the inner contact member 140 and the outer contact member 148.

In some embodiments, the shim 152 may be located above the inner contact member 140 and may axially abut the upper surface 142 of the inner contact member 140 when the inner tube 102 is in the intermediate position. In such embodiments, the shim may or may not abut the upper surface 142 when the inner tube 102 is in the retracted position. In other embodiments, the shim 152 may be located below the inner contact member 140 and may axially abut a lower surface 180 of the inner contact member 140 when the inner tube 102 is in the intermediate position. In such embodiments, the shim may or may not abut the lower surface 180 when the inner tube 102 is in the retracted position.

In the illustrated example in FIGS. 6-8, the shim 152 is located above the inner contact member 140 and axially abuts the upper surface 142 of the inner contact member 140 when the inner tube 102 is in the intermediate position and when the inner tube 102 is in the retracted position. In such a configuration, the shim 152 travels with the inner contact member 140 as the inner tube 102 moves from the retracted position to the intermediate position and vice versa. In this arrangement, the shim 154 bears against the same upper surface 142 (e.g. to limit the inner tube 102 in the intermediate position) that would otherwise contact the outer contact member 148 in the extended position in the absence of the shim 154.

The shim 152 can be any shape that allows for the shim 152 to be engaged by and maintain an axial gap between the inner contact member 140 and the outer contact member 148. For example the shim 152 may be a round pin, a disc, or rod-shaped with a round, square, or polygonal cross-section. The shim 152 may be made from any suitable material, including but not limited to brass, metal, aluminium, plastic, or steel. The shim 152 may be made from the same material as the inner contact member 140, or may be made of a different material than the inner contact member 140.

Figure 9:
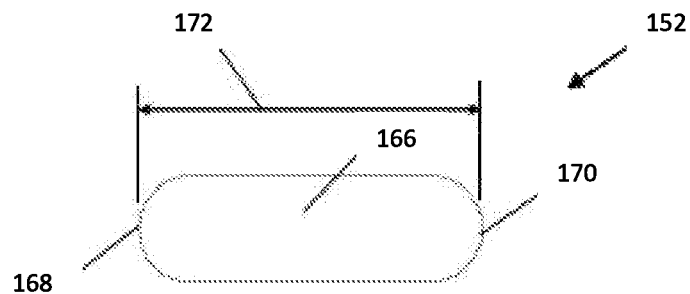
FIG. 9 is a front view of one example of a shim.
Figure 10:
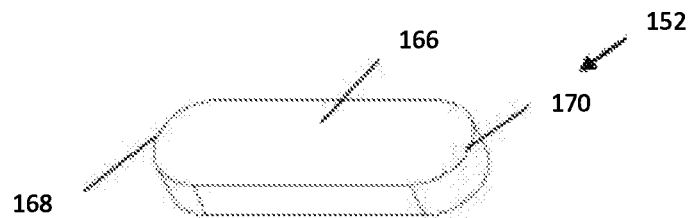
FIG. 10 is a front perspective view of the shim of FIG. 9.

Referring to FIGS. 9 and 10, in the illustrated example, the shim 152 comprises an elongate rod, the rod comprising a body 166, a lower surface 168, and an upper surface 170. The shim length 172 is the distance from the upper surface 170 to the lower surface 168. The shim 152 can be any length that allows for a given embodiment of the shim 152 to be positionable axially on the seat post assembly as described herein. For example, the shim may be between about 1 mm and about 20 mm, preferably between about 5 mm and 15 mm, and more preferably about 10 mm.

In some embodiments, the shim 152 is connected to and moveable with the inner tube 102. In some embodiments, as in the illustrated example, this is achieved by positioning the shim 152 within the auxiliary groove segment 154 in the inner tube 102. To facilitate the positioning of the shim 152 within the auxiliary groove segment 154, the auxiliary groove length 174 is greater than or equal to the shim length 172. In the illustrated embodiment, where the primary groove 136 and auxiliary groove segment 154 are contiguous, the sum of the auxiliary groove length 174 and primary groove length 146 is greater than or equal to sum of the inner contact member length 144 and the shim length 172.

In some embodiments, the bicycle seat post assembly includes a control assembly or mechanism to urge the inner tube 102 from the retracted position toward the extended position. The control assembly may include an actuator 108 as shown in this example. When the actuator 108 is actuated, the inner tube 102 moves from the retracted position to the extended position. By actuating the actuator 108, the locking air spring (not shown) is unlocked, allowing the inner tube 102 to slide freely along axis 110 (FIG. 1). Other parts of the control assembly may include a trigger that is linked to the actuator 108 and is positioned where it can be accessed by the user (typically on the handle bars).

In the illustrated example, when the shim 152 is inserted into primary groove 136 and the actuator 108 is actuated, the inner tube 102 moves from the retracted position towards the extended position but is stopped when the upper surface 170 of the shim 152 abuts against the outer contact member 148 and the lower surface 168 of the shim 152 abuts against the upper surface 142 of the inner contact member 140. At this point, the upper tube 102 has reached its maximum travel length, or its intermediate position. If the shim 152 is removed from the seat post assembly, the inner tube 102 is extendible to the extended position.

Figures 11A, 11B:
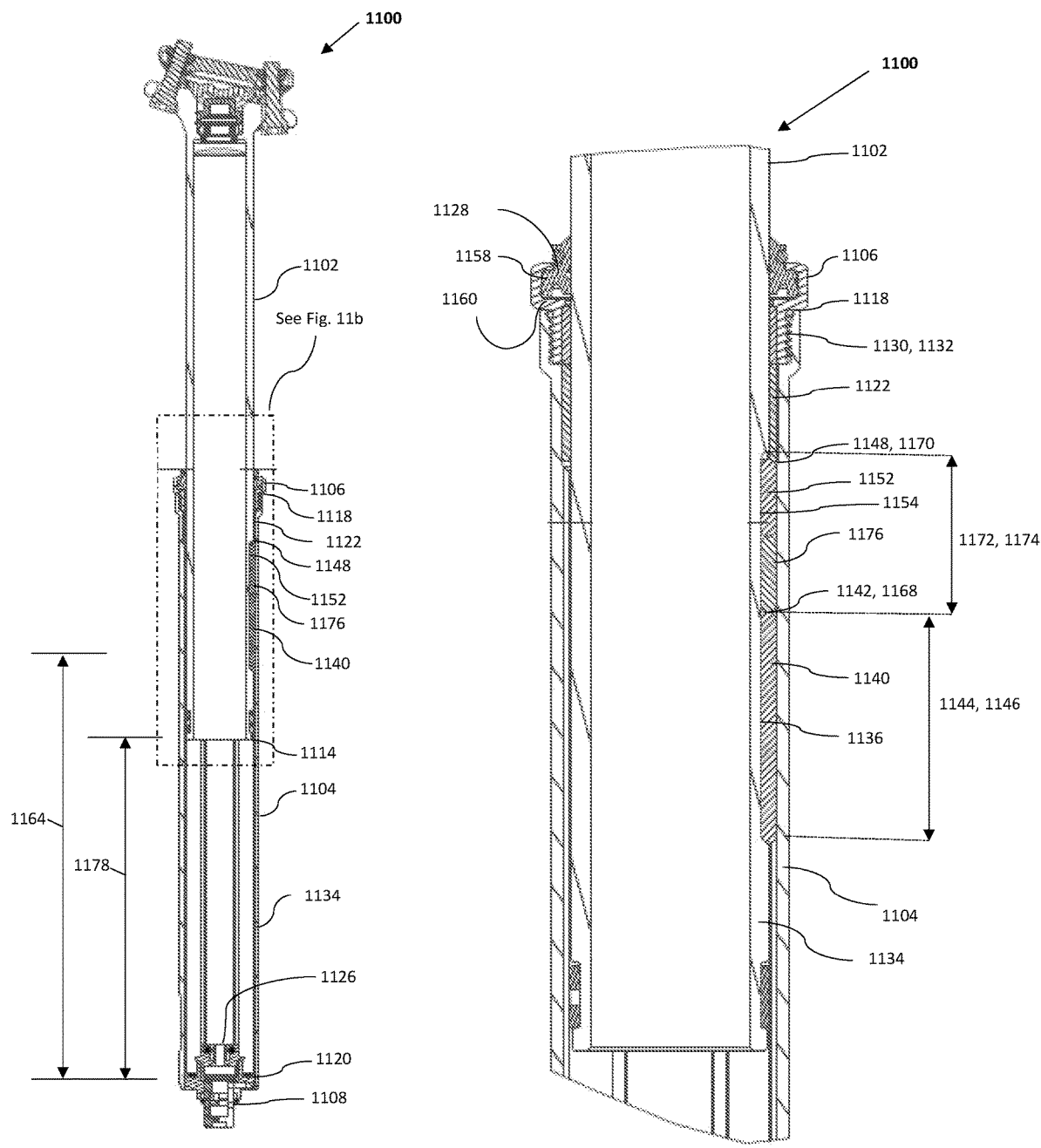
Figure 12:
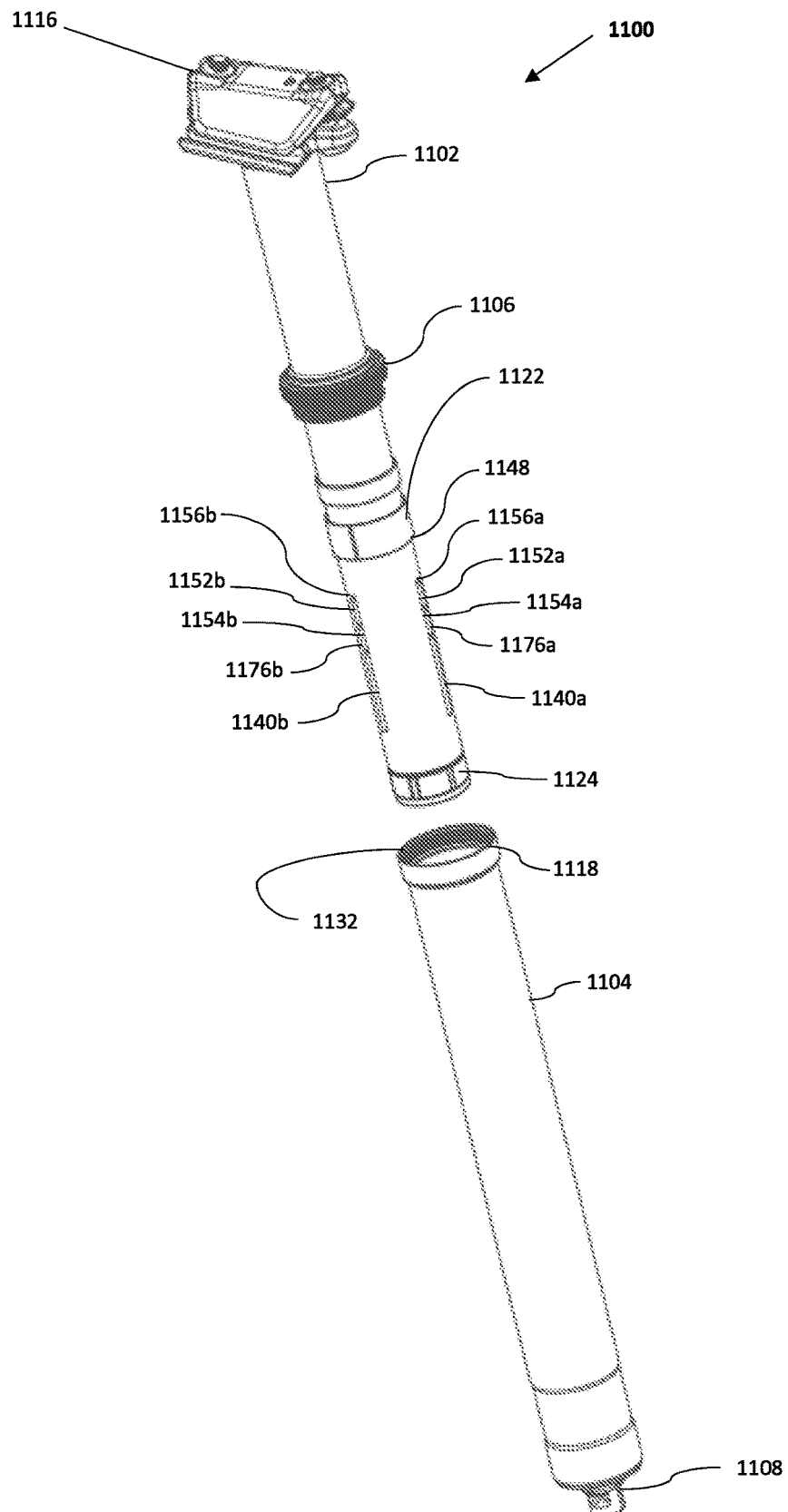
Figures 14, 15:
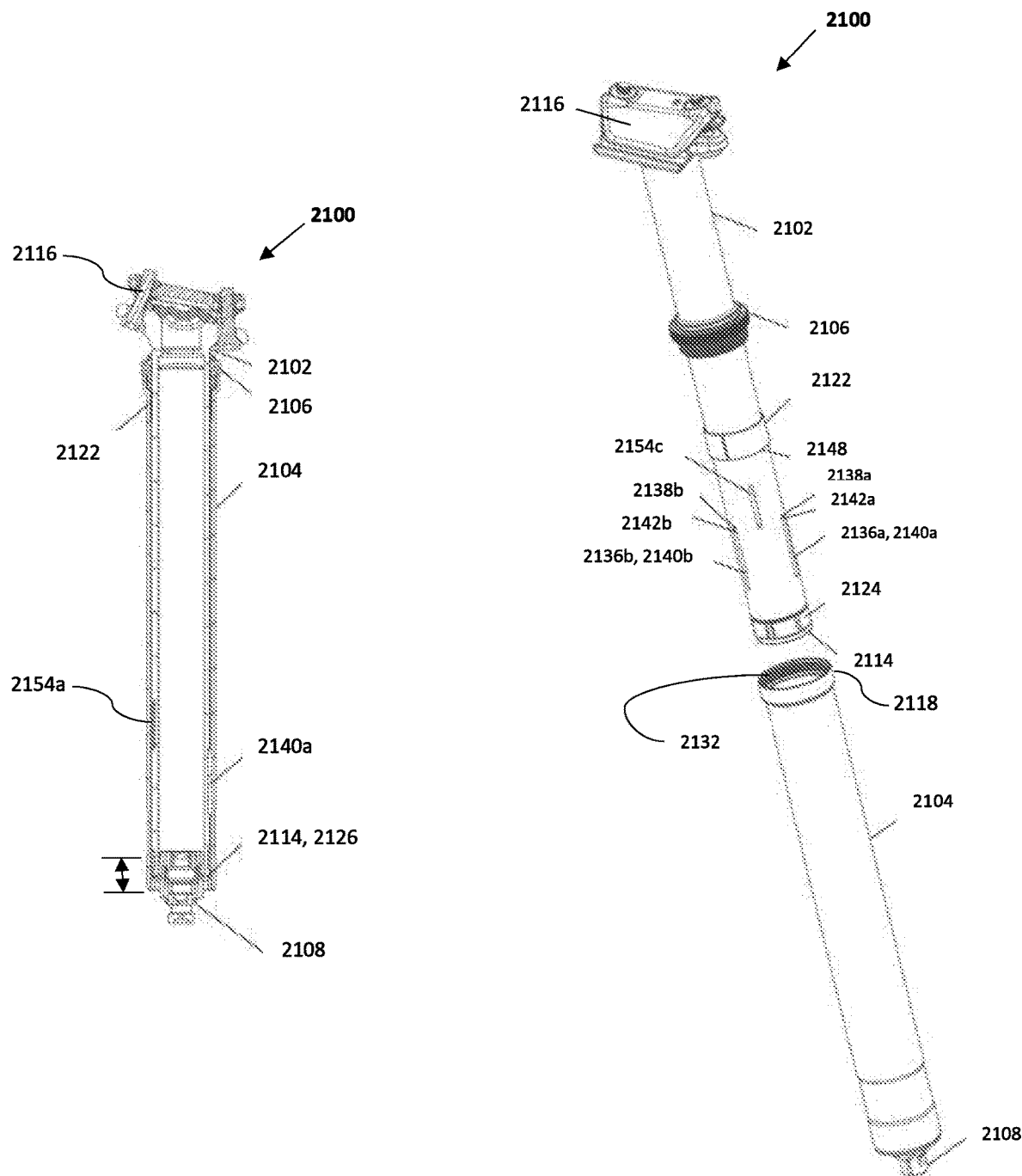

FIGS. 11a to 12 illustrate an alternative embodiment of bicycle seat post assembly 1100 that is generally analogous to bicycle seat post assembly 100, and in which analogous features are identified using like reference characters indexed by 1000.

In this embodiment, the bicycle seat post assembly 1100 comprises a second shim 1176 that is insertable between the first shim 1152 and one of the inner contact member 1140 and the outer contact member 1148. The second shim 1176 is attachable independently of the first shim 1152.

In the illustrated example, two shims, 1152 and 1176, are positioned axially in auxiliary groove segment 1154, between inner contact member 1140 and outer contact member 1148. In other embodiments, two shims 1152, 1176 may be positioned in primary groove 1136/auxiliary groove segment 1154 axially on either side of the inner contact member 1140 or both shims 1152, 1176 may be positioned in primary groove 1136/auxiliary groove segment 1154 axially below the inner contact member 1140. In other embodiments, three or more shims may be inserted.

When attached to one of the inner tube 1102 and the outer tube 1104, the second shim 1176 limits the axial extension of the inner tube 1102 to a secondary intermediate position that is between the retracted position and the intermediate position. In the secondary intermediate position, the lower end 1114 of the inner tube 1102 is axially spaced apart from the lower end 1120 of the outer tube 1104 by a third distance 1178. The third distance 1178 is the seat post travel length of the secondary intermediate position of the seat post assembly. The third distance 1178 is less than the first distance 1150 of the seat post (i.e., with no shim inserted and the seat post assembly in the extended position) and less than the second distance 1164 (i.e., with one shim inserted and the seat post assembly in the intermediate position—shown in phantom in FIG. 11a for reference).

FIGS. 13-17 illustrate an alternative embodiment of the bicycle seat post assembly 2100 that is generally analogous to seat post assembly 100, and in which analogous features are identified using like reference characters indexed by 2000.

Figure 17:
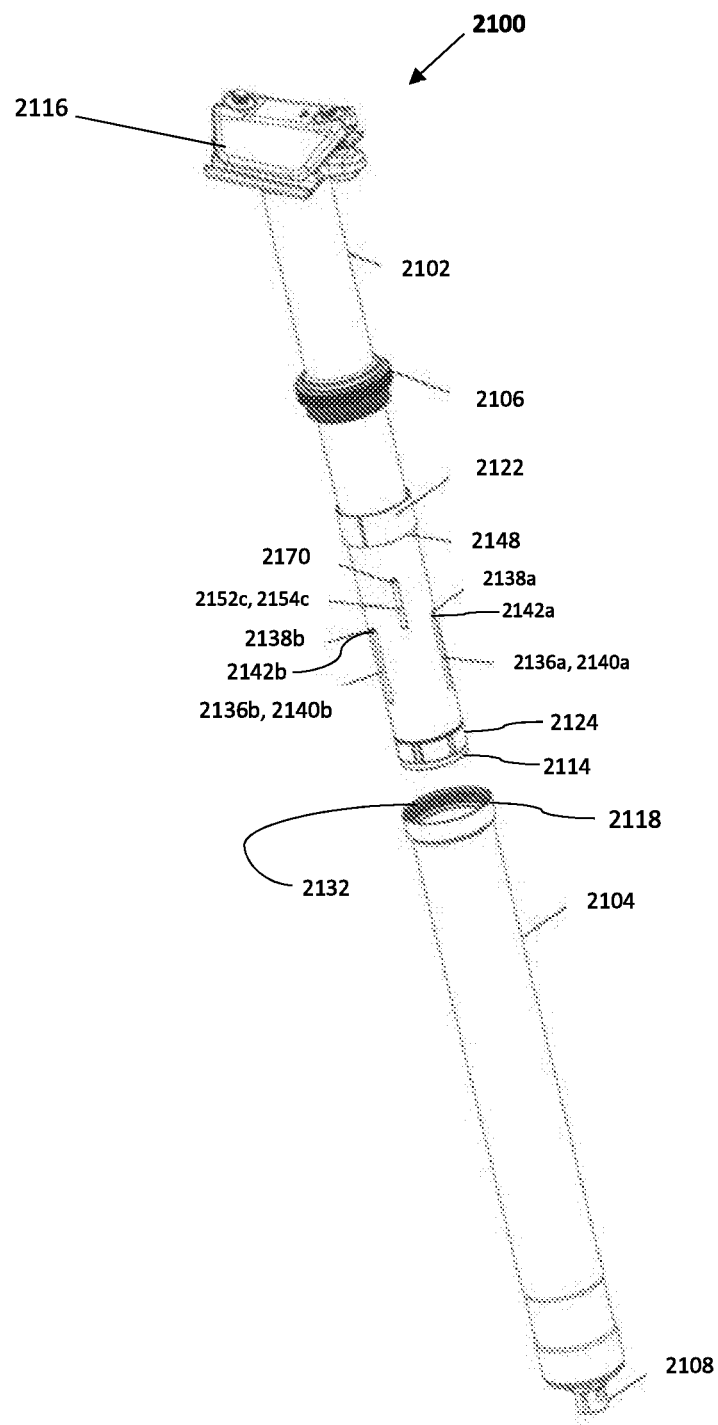
FIG. 17 is a partially exploded perspective view of the seat post assembly of FIG. 16.

In this embodiment, the auxiliary groove segment 2154 of the bicycle seat post assembly 2100 is laterally offset from the primary groove segment 2136 about a perimeter of the inner tube 2102 sidewall. As illustrated in FIG. 17, the auxiliary groove segment 2154 is at least partially above and laterally offset from the primary groove segment such that the shim 2152 does not abut the inner contact member 2140. Instead, when a shim 2152 is attached to the auxiliary groove segment 2154 and slides within a corresponding shim groove 2182. As the inner tube 2102 moves from the retracted position towards the extended position, the shim 2152 is engaged by the outer contact member 2148 and maintains an axial gap between the inner contact member 2140 and the outer contact member 2148, thereby limiting the axial extension of the inner tube 2102 to an intermediate position that is between the retracted position and the extended position. In the intermediate position, the lower end 2114 of the inner tube 2102 is axially spaced apart from the lower end 2120 of the outer tube 2104 by a second distance 2164. The second distance 2164 is the seat post travel length of the intermediate position of the seat post assembly. The second distance 2164 is less than the first distance 2150 of the seat post.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

What is claimed is:

1. A bicycle seat post assembly comprising:
   a. a base assembly connectable to a bicycle and having an outer tube having an upper end, a lower end spaced apart from the upper end along an assembly axis and a collar secured on the upper end;
   b. an extension assembly comprising an inner tube having an upper end for connecting to a bicycle seat, a lower end that is telescopically receivable in the outer tube and an inner contact member positioned toward the lower end of the inner tube and slidable with the inner tube within the outer tube, wherein the inner tube is movable relative to the outer tube between a retracted position in which the lower end of the inner tube is disposed toward the lower end of the outer tube and an extended position in which the inner tube is spaced from the lower end of the outer tube by an extended distance; and
   c. a positioning assembly comprising one or more shims with a plurality of axially spaced apart lower surfaces that are each configured to contact an upper surface of the inner contact member at a respective shim length, the one or more shims being retained within the base assembly when the collar is secured on the upper end so that when the inner tube is moving from the retracted position toward the extended position the inner contact member engages one of the lower surfaces to limit the axial extension of the inner tube at an intermediate position in which the lower end of the inner tube is spaced from the lower end of the outer tube by an intermediate distance that is less than the extended distance.

2. The assembly of claim 1, wherein the one or more shims are attachable to and move with the inner tube relative to the outer tube.

3. The assembly of claim 2, wherein the one or more shims comprises a plurality of shims that are laterally aligned so that intermediate distance is less than the extended distance by a sum total of the respective shim lengths of the plurality of shims.

4. The assembly of claim 1, wherein the inner tube comprises an inner sidewall extending between the upper and lower ends and having an axially extending primary groove segment disposed toward the lower end, and wherein the inner contact member comprises an axially extending, elongate pin that is partially nested within the primary groove segment.

5. The assembly of claim 4, wherein the inner sidewall further comprises an auxiliary groove segment and wherein the one or more shims are partially nested within the auxiliary groove.

6. The assembly of claim 5, wherein the auxiliary groove segment is substantially parallel to the primary groove segment.

7. The assembly of claim 5, wherein the auxiliary groove segment is laterally offset from the primary groove segment about a perimeter of the inner sidewall.

8. The assembly of claim 5, wherein the auxiliary groove segment is laterally aligned with the primary groove segment.

9. The assembly of claim 5, wherein the auxiliary groove segment and primary groove segment are both part of a common recess and are contiguous with each other.

10. The assembly of claim 9, wherein the inner contact member can be partially received within the primary groove segment and the auxiliary groove segment when the one or more shims are not disposed within the auxiliary groove segment and is repositionable within the common recess relative to the inner tube, and wherein the inner tube is configured so that the inner contact member is movable upwardly relative to the inner tube sidewall to a raised position and when the one or more shims are positioned within the common recess adjacent a lower end of the inner contact member to support the inner contact member in the raised position.

11. The assembly of claim 5, wherein the auxiliary groove segment extends at least partially axially above the primary groove segment.

12. The assembly of claim 5, wherein upper ends of both the primary groove segment and auxiliary segment remain within an interior of the outer tube when the inner tube is in the extended position.

13. The assembly of claim 12, wherein the upper end of the outer tube comprises a sealing member configured to seal against the inner tube to seal an interior of the outer tube, and wherein the upper ends of both the primary groove segment and auxiliary segment are spaced below an upper edge of the sealing member when the inner tube is in the extended position.

14. The assembly of claim 13, wherein the upper ends of both the primary groove segment and auxiliary segment are spaced below an opposing lower edge the sealing member when the inner tube is in the extended position.

15. The assembly of claim 5, wherein the collar is removable and the inner tube is then movable to a maintenance position relative to the outer tube in which the lower end of the inner tube remains within the outer tube and is spaced from the lower end of the outer tube by a maintenance distance that is greater than the extended distance, and wherein the one or more shims are removable from the base assembly when the inner tube is in the maintenance position.

16. The assembly of claim 1, wherein the inner contact member has an axial upper surface that engages the one of the lower surfaces of the one or more shims to limit the axial extension of the inner tube when the inner tube is in the intermediate position.

17. The assembly of claim 1, wherein when the one or more shims are removed and the collar is secured on the upper end, the inner tube is again movable to the extended position.

18. The assembly of claim 1, wherein in the extended position the inner contact member engages an outer contact member of the bicycle seat post assembly, so that the lower end of the inner tube is spaced from the lower end of the outer tube by the extended distance.

19. The assembly of claim 18, wherein the base assembly comprises a bushing toward the upper end of the outer tube to stabilize the movement of the inner tube, and wherein a lower surface of the bushing comprises the outer contact member.

20. The assembly of claim 1, wherein the intermediate distance is less than the extended distance by at least the respective shim length of the lower surface that the inner contact member engages.

* * * * *